(12) United States Patent
Elliott

(10) Patent No.: US 6,509,830 B1
(45) Date of Patent: Jan. 21, 2003

(54) SYSTEMS AND METHODS FOR PROVIDING CUSTOMIZABLE GEO-LOCATION TRACKING SERVICES

(75) Inventor: Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/586,457

(22) Filed: Jun. 2, 2000

(51) Int. Cl.$^7$ .................................................. G08B 9/00
(52) U.S. Cl. .................. 340/286.02; 340/506; 340/517; 340/3.1; 340/825.36; 340/825.49; 340/539
(58) Field of Search ................................. 340/506, 517, 340/524, 525, 539, 541, 3.1, 825.36, 825.49, 286.02, 7.1

(56) References Cited

U.S. PATENT DOCUMENTS

| | | | |
|---|---|---|---|
| 5,225,842 A | 7/1993 | Brown et al. | 342/357.09 |
| 5,418,537 A | 5/1995 | Bird | 342/357.09 |
| 5,422,816 A | 6/1995 | Sprague et al. | 455/575 |
| 5,515,043 A | 5/1996 | Berard et al. | 340/988 |
| 5,600,061 A | 2/1997 | Yabushita et al. | 73/178 R |
| 5,646,593 A | 7/1997 | Hughes et al. | 340/573.1 |
| 5,650,770 A | 7/1997 | Schlager et al. | 340/573.1 |
| 5,652,570 A | 7/1997 | Lepkofker | 340/573.4 |
| 5,805,079 A | 9/1998 | Lemelson | 340/870.03 |
| 5,850,196 A | 12/1998 | Mowers | 342/357.07 |
| 5,902,351 A | 5/1999 | Streit et al. | 701/220 |
| 5,917,405 A * | 6/1999 | Joao | 340/426 |
| 5,917,434 A | 6/1999 | Murphy | 340/991 |
| 5,929,753 A | 7/1999 | Montague | 340/426 |
| 5,949,350 A | 9/1999 | Girard et al. | 340/825.49 |
| 5,955,942 A | 9/1999 | Slifkin et al. | 340/436 |
| 6,211,782 B1 * | 4/2001 | Sandelman et al. | 340/506 |

* cited by examiner

*Primary Examiner*—Daryl Pope
(74) *Attorney, Agent, or Firm*—Leonard Charles Suchyta; James K. Weixel

(57) ABSTRACT

A system enables tracking of a communication device associated with a subscriber of a geo-location tracking service. The system receives (1115) a set of subscriber-defined alarm conditions associated with the tracked communication device. The system further receives location (1435) and sensor data (1440) associated with the communication device. The system compares (1510) the location and sensor data with each alarm condition of the set of subscriber-defined alarm conditions. The system indicates an occurrence of one or more alarm events based on the comparison (1520).

27 Claims, 16 Drawing Sheets

SYSTEMS AND METHODS FOR PROVIDING CUSTOMIZABLE GEO-LOCATION TRACKING SERVICES

FIELD OF THE INVENTION

The present invention relates generally to geographic location determining devices and, more particularly, to a system and method for providing a customizable geographic location determining service.

BACKGROUND OF THE INVENTION

Numerous systems have been conventionally implemented for determining a geographic location, and other parameters, of a geo-location determining device associated with persons, things, or apparatuses. Such conventional systems typically include Global Positioning Systems (GPS) to perform the geo-location determination. For example, geolocation devices have been implemented within vehicles for monitoring various vehicle status conditions, such as location, speed, or acceleration. Additionally, geo-location devices have been implemented for monitoring the geo-locations of persons or animals, such as children or pets.

Conventional systems, however, are typically designed for monitoring only specific preset parameters associated with a geo-location device. For example, a conventional system may be designed to enable a user to monitor only a location and one other parameter, such as speed or acceleration, of a geo-location device. Furthermore, conventional systems only permit users to monitor geo-location devices at dedicated central monitoring stations. Conventional systems, therefore, limit access to geo-location device location data to those users who are able to physically access the remote central monitoring station.

Therefore, there exists a need for a system and method that permit a user to tailor the desired parameters that are to be monitored at a geo-location device. There further exists a need for a system and method that permit a user to conveniently access monitored parameters of a geo-location device from nearly any geographic location, thus, eliminating the requirement that a user obtain physical access to a single remote monitoring station.

SUMMARY OF THE INVENTION

Systems and methods consistent with the present invention address these needs by providing a geo-location tracking service that permits service subscribers to customize the parameters associated with a tracked device that are to be monitored. A customizable geo-location tracking service, therefore, enables subscribers to tailor the monitored tracked device parameters to fit their particular requirements. Additionally, systems and methods consistent with the present invention provide a geo-location tracking server that receives and stores geo-location and other data from the tracked devices of subscribing users. Use of a geo-location tracking server permits subscribers to obtain remote access to tracked device data stored at the server via a network that interconnects the subscribers with the geo-location tracking server.

In accordance with the purpose of the invention as embodied and broadly described herein, a method of notifying a subscriber of an event notification service of an occurrence of one or more alarm events includes receiving subscriber identity data identifying a subscriber of said service. The method further includes receiving one or more subscriber-selected and defined alarm conditions. The method also includes receiving data associated with at least one of an environment, movement, and operation of a first communication device. The method additionally includes comparing the data with the alarm conditions to determine an occurrence of one or more alarm events. The method further includes communicating an alarm event notification to the subscriber at a second communication device based on the comparison.

In another implementation consistent with the present invention, a method of notifying a subscriber of an event notification service of an occurrence of one or more alarm events includes receiving data associated with at least one of an environment, movement and operation of a first communication device. The method further includes comparing the data with subscriber-selected and defined alarm conditions. The method additionally includes communicating an alarm event notification to a second communication device based on the comparison, wherein the second communication device is selected from a plurality of subscriber-designated communication devices.

In a further implementation consistent with the present invention, a method of tracking a communication device includes receiving a set of subscriber-defined alarm conditions associated with the communication device. The method further includes receiving location and sensor data associated with the communication device. The method also includes comparing the location and sensor data with each alarm condition of the set of subscriber-defined alarm conditions. The method additionally includes indicating an occurrence of one or more alarm events based on the comparison.

In an additional implementation consistent with the present invention, a method of notifying a subscriber of an event notification service of an occurrence of one or more alarm events includes receiving a customized set of alarm conditions from a subscriber of said service. The method further includes sensing parameters associated with at least one of an environment, movement and operation of a communication device. The method additionally includes comparing the customized set of alarm conditions with the sensed parameters. The method further includes notifying the subscriber of an occurrence of one or more alarm events based on the comparison.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a geo-location tracking service that permits service subscribers to customize the parameters, associated with a tracked device, that are to be monitored. The customizable geo-location tracking service of the present invention, therefore, enables subscribers to tailor the monitored tracked device parameters to fit their particular requirements. Additionally, systems and methods consistent with the present invention provide a tracking server that receives and stores geo-location and other data from the tracked devices of subscribing users. Use of a tracking server permits subscribers to obtain remote access to the tracked device data stored at the server via a network that interconnects the subscribers with the tracking server.

Exemplary System

Figure 1:
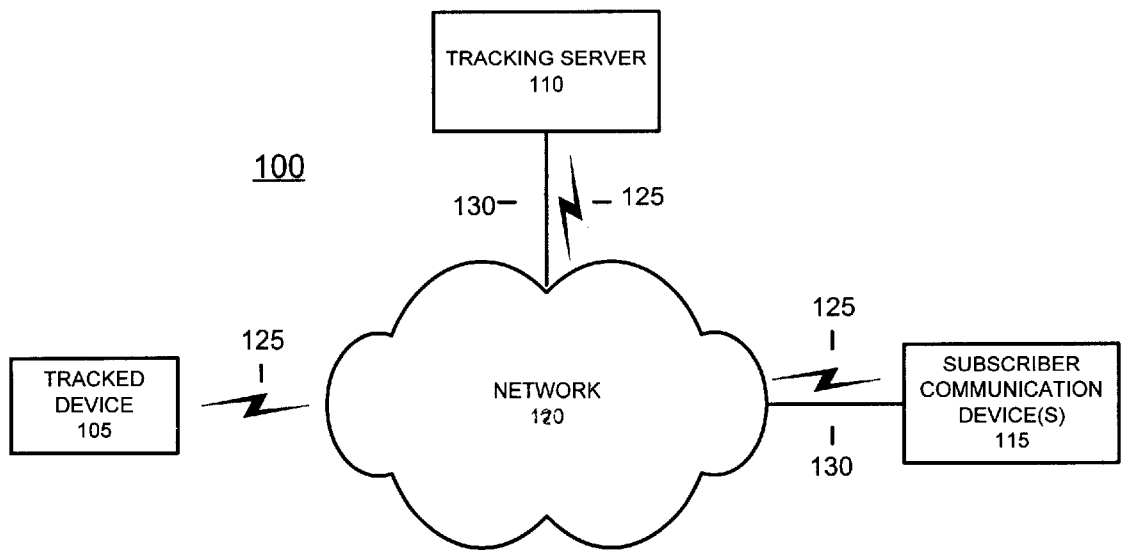
FIG. 1 illustrates an exemplary network in which a system and method, consistent with the present invention, may be implemented.

FIG. 1 illustrates an exemplary network 100 in which a system and method, consistent with the present invention, provide customizable geo-location tracking services. Network 100 includes tracked device 105, tracking server 110, one or more subscriber communication device(s) 115 and network 120. Tracked device 105 connects to network 120 via a wireless link 125. Tracking server 110 and subscriber communication device(s) 115 connect to network 120 via one or more wireless (125), wireline (130), or optical links (not shown).

Network 120 can include one or more networks of any type, including a local area network (LAN), metropolitan area network (MAN), wide area network (WAN), Internet, Intranet, or Public Switched Telephone Network (PSTN).

Tracked device 105 can include various wireless devices, including a special purpose RF transmitter, a cellular telephone, a personal digital assistant (PDA), a personal or portable computer, a two-way pager, a wireless Internet device or the like.

Tracking server 110 can include a single server or multiple distributed servers that store subscriber data and tracked device historical data. In one implementation consistent with the present invention, the subscriber communication device(s) 115 perform the functions of the server 110. In this implementation, the server 110 may be unnecessary or may forward information between the tracked device 105 and the subscriber device(s) 115.

Subscriber communication device(s) 115 can include one or more communication devices, such as a conventional telephone, a personal or portable computer, a pager, a wireless Internet device or the like. Subscriber communication device(s) 115 can receive communications from tracking server 110 or tracked device 105 via network 120.

Exemplary Tracked Device

Figure 2:
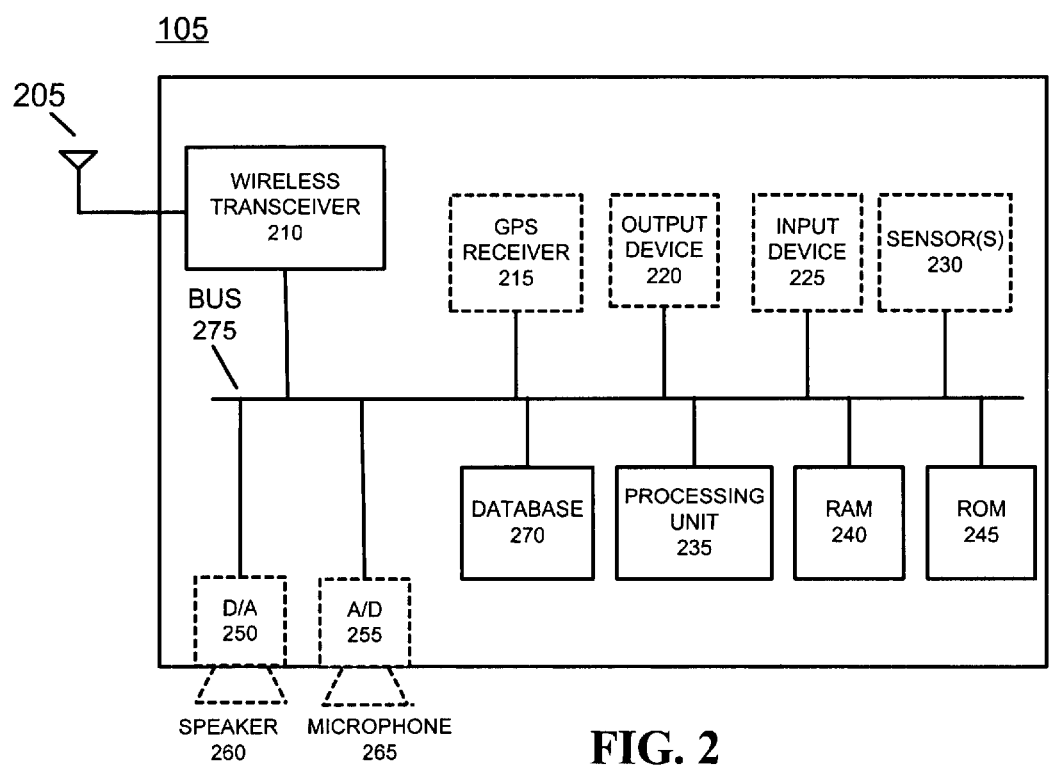
FIG. 2 illustrates exemplary components of a wireless tracked device consistent with the present invention.

FIG. 2 illustrates an exemplary tracked device 105 in which a system and method, consistent with the present invention, may be implemented to monitor a geographic location and other parameters of a person, thing, or apparatus. Exemplary tracked device 105 may include an antenna 205, a wireless transceiver 210, an optional Global Positioning System (GPS) receiver 215, an optional output device 220, an optional input device 225, one or more optional sensors 230, a processing unit 235, a Random Access Memory (RAM) 240, a Read Only Memory (ROM) 245, an optional (D/A) digital-to-analog converter 250, an optional analog-to-digital (A/D) converter 255, an optional speaker 260, an optional microphone 265, a bus 270, and a database 275.

Antenna 205 may include a conventional antenna that facilitates reception and transmission of data by wireless transceiver 210. Wireless transceiver 210 may include transceiver circuitry well known to one skilled in the art that can be tuned to multiple channels reserved for transmitting data. A channel can be a frequency, code, or time division of a physical radio frequency. GPS receiver 215 includes conventional mechanisms for receiving location signals that can be used for determining a current geographic location of tracked device 105.

Output device 220 may include conventional output mechanisms that permit the output of tracked device 105 data in video, audio, or hard copy format. Input device 225 may permit entry of data into tracked device 105 and includes a user interface (not shown). Sensor(s) 230 may include one or more optional sensing devices, such as an accelerometer, an inclinometer, an oxygen sensor, a temperature sensor, a blood oxygen sensor, a pulse rate sensor, or other appropriate sensing devices.

Processing unit 235 performs all data processing functions for inputting, outputting, and processing of data for tracked device 105 including apparatus control functions, such as call processing control, user interface control or the like. RAM 240 provides temporary working storage of data and instructions for use by processing unit 235. ROM 245 provides permanent or semi-permanent storage of data and instructions for use by processing unit 235. RAM 240 and ROM 245 may include large-capacity storage devices, such as a magnetic and/or optical recording medium and its corresponding drive.

D/A converter 250 includes conventional circuitry for converting digital audio signals from digital-to-analog signal form for output, for example, via speaker 260. A/D converter 255 includes conventional circuitry for converting analog audio input signals, received from microphone 265, to digital signal form. Speaker 260 includes a conventional mechanism for providing an auditory output of the D/A-converted audio signals. Microphone 265 includes a conventional mechanism for converting auditory input into analog signals. Database 270 maintains subscriber information data and historical data and may include a large-capacity storage device, such as a magnetic or optical recording medium and its corresponding drive. Bus 275 interconnects the various components of tracked device 105 and allows the components to communicate with one another.

Exemplary Tracked Device Database

Figure 3:
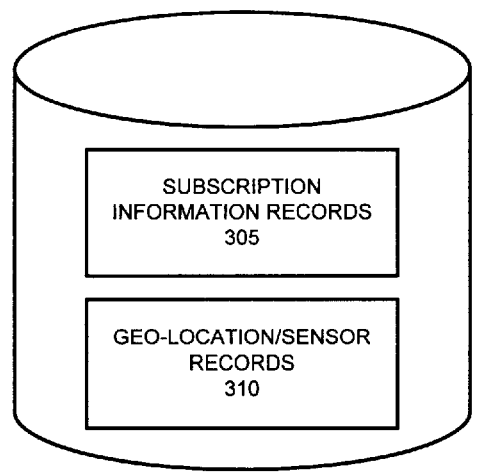
FIG. 3 illustrates an exemplary tracked device database consistent with the present invention.

FIG. 3 illustrates an exemplary database 270, consistent with the present invention, of tracked device 105. Database 270 may include subscription information records 305 and geo-location/sensor records 310.

Figure 4:
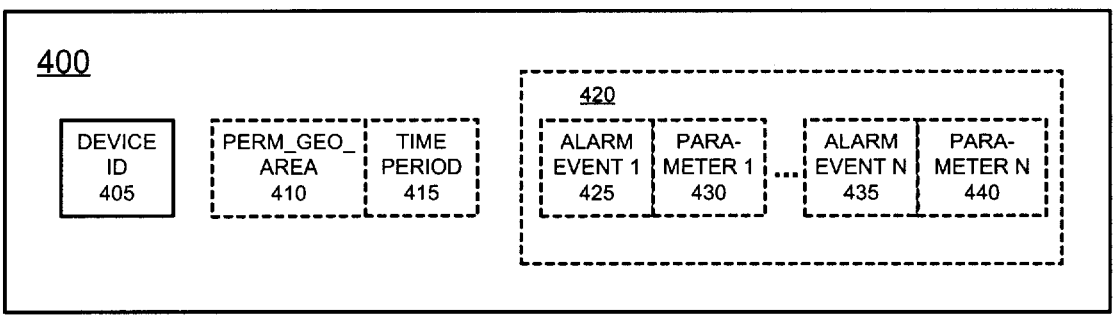
FIG. 4 illustrates an exemplary subscription information record consistent with the present invention.

FIG. 4 illustrates a single exemplary subscription information record 400, consistent with the present invention, of subscription information records 305. Record 400 may contain a device identifier (DEVICE ID 405), parameters detailing one or more subscriber-defined permissible geographic areas (PERM_GEO_AREA 410) for tracked device 105 and one or more time periods (TIME PERIOD 415) associated with the permissible geographic areas. Record 400 may further include a block of alarm event data 420 containing data specifying subscriber-defined alarm events (ALARM EVENT 1 425–ALARM EVENT N 435) and associated alarm parameters (PARAMETER 1 430–PARAMETER N 440).

PERM_GEO_AREA 410 may include numeric or textual data specifying desired geographic limits on the travel of tracked device 105. TIME PERIOD 415 may contain data indicating time periods during which a permissible geographic area is active. As an example, PERM_GEO_AREA 410 may contain data indicating a permissible geographic area spanning a 100 yard diameter around a subscriber's home and TIME PERIOD 415 may contain a time period of 6 p.m. to 10 p.m. associated with PERM_GEO_AREA 410. Thus, the subscriber's tracked device 105 may only travel 100 yards from the subscriber's house during the hours of 6 p.m. to 10 p.m. without setting off an alarm event.

Alarm events (ALARM EVENT 1 425–ALARM EVENT N 435) specify the types of reported from tracked device 105 that should initiate communication with a subscriber to indicate an occurrence of an alarm event. Alarm parameters (PARAMETER 1 430–PARAMETER N 440) specify the parameters of the data reported from tracked device 105 that should initiate communication with a subscriber indicating the occurrence of an alarm event. ALARM EVENT 1 425, for example, may indicate a speed of tracked device 105 as an alarm event. Associated alarm parameter PARAMETER 1 430 may, for example, indicate that any speed of the tracked device 105 greater than 75 kilometers per hour is an alarm event.

Figure 5:
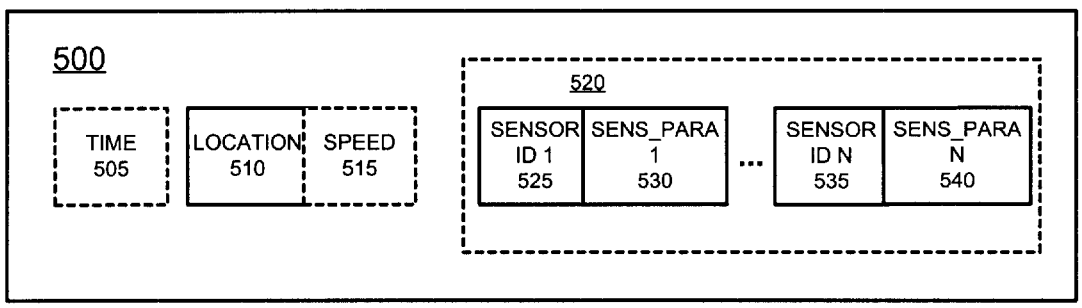
FIG. 5 illustrates an exemplary geo-location/sensor record consistent with the present invention.

FIG. 5 illustrates a single exemplary geo-location/sensor record 500, consistent with the present invention, of geo-location/sensor records 310. Record 500 may contain a time parameter (TIME 505) indicating the time at which a report was received from a tracked device 105, a location parameter (LOCATION 510) indicating a geographic position where tracked device 105 was located at TIME 505, an optional speed parameter (SPEED 515) indicating a calculated speed of tracked device 105 at TIME 505 and sensor data 520. Sensor data 520 may include one or more sensor identifiers (SENSOR ID 1 525–SENSOR ID N 535) identifying particular sensors of sensors 230, and one or more sensor parameters (SENS_PARA 1 530–SENS_PARA N 540) indicating values of the data sensed at particular sensors of sensors 230.

Sensor identifiers (SENS ID 1 525–SENS ID N 535) contain data indicating a type of parameter sensed by sensor(s) 230 of tracked device 105 at TIME 505 (e.g., acceleration, oxygen, temperature, blood oxygen, pulse rate, or an emergency indicator). Sensed parameters (SENS_PARA 1 530–SENS_PARA N 540) contain data indicating the specific parameter sensed by sensor 230 of tracked device 105 at TIME 505.

As an example, record 500 may contain a time parameter TIME 505 indicating 4:02 pm, a location parameter LOCATION 510 containing a position of 50 degrees 5 minutes longitude and 75 degrees 20 minutes latitude. Record 500 may also include a speed parameter 515 indicating that the tracked device was traveling at 60 kilometers per hour at 4:02pm. Record 500 may additionally include a sensor identifier SENSOR ID 1 525 indicating a temperature and a SENS_PARA 1 530 indicating a temperature of 35 degrees Celsius.

Exemplary Tracking Server

Figure 6:
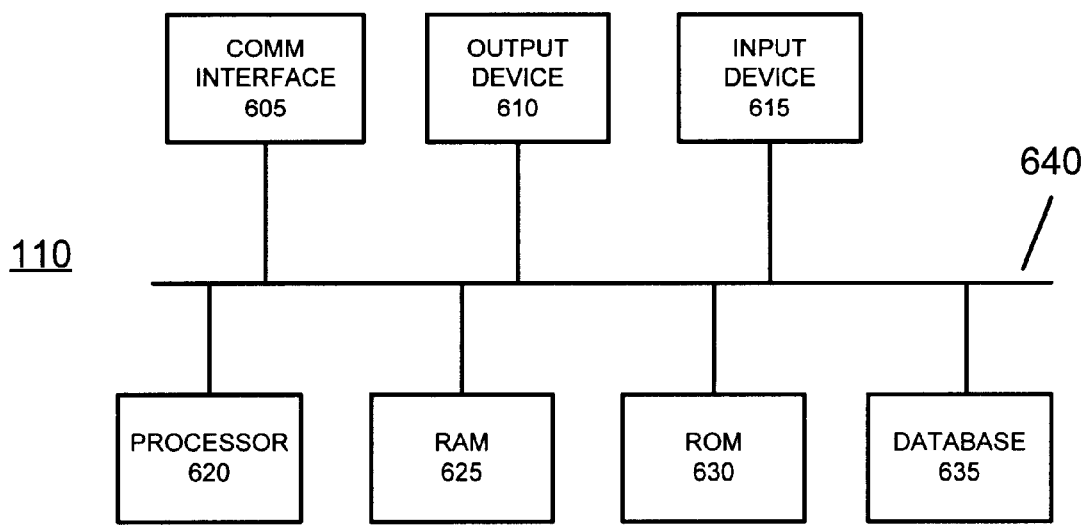
FIG. 6 illustrates exemplary components of a tracking server consistent with the present invention.

FIG. 6 illustrates exemplary components of tracking server 110. Exemplary tracking server 110 may include a communication interface 605, an output device 610, an input device 615, a processor 620, a RAM 625, a ROM 630, a database 635, and a bus 640. Communication interface 605 may include conventional mechanisms that connect server 110 to another device or network, such as network 120. Output device 610 permits the output of server data in video, audio, or hard copy format. Input device 615 permits entry of data into server 110.

Processor 620 may include a conventional processing device that performs all data processing functions for inputting, outputting, and processing of server data. RAM 625 and ROM 630 may include large-capacity storage devices, such as a magnetic and/or optical recording medium and its corresponding drive. RAM 625 provides temporary working storage of server data and instructions for use by processor 620. ROM 630 provides permanent or semi-permanent storage of data and instructions for use by processor 620. Database 635 maintains subscriber data and historical data and may include a large-capacity storage device, such as a magnetic or optical recording medium and its corresponding drive. Bus 640 interconnects the various components of server 110 and allows the components to communicate with one another.

Exemplary Server Database

Figure 7:
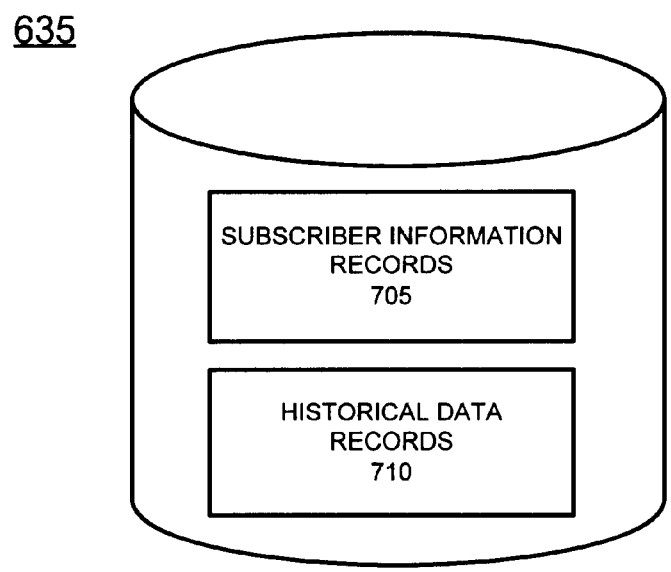
FIG. 7 illustrates an exemplary server database consistent with the present invention.

FIG. 7 illustrates an exemplary database 635 consistent with the present invention. Database 635 may include subscriber information records 705 and historical data records 710.

Figure 8:
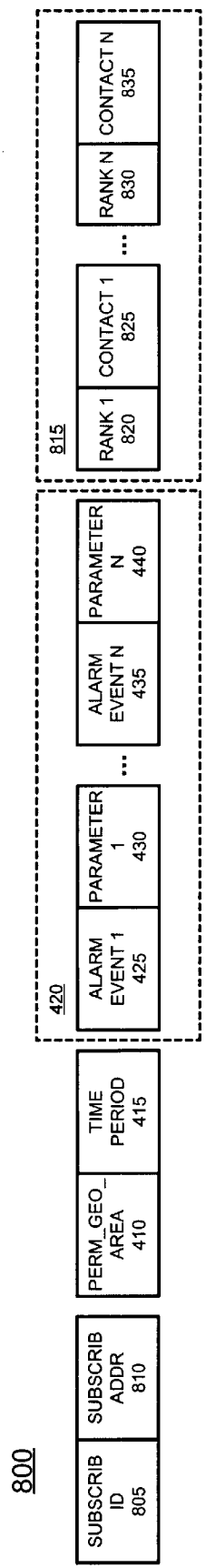
FIG. 8 illustrates an exemplary subscriber information record consistent with the present invention.

FIG. 8 illustrates a single exemplary subscriber information record 800, consistent with the present invention, of subscriber information records 705. Subscriber information record 800 may contain a subscriber identifier (SUBSCRIB ID 805), a subscriber address (SUBSCRIB ADDR 810), parameters detailing one or more subscriber defined permissible geographic areas (PERM_GEO_AREA 410) for tracked device 105, and one or more time periods (TIME PERIOD 415) associated with the permissible geographic areas.

Record 800 may further include a block of alarm event data 420 containing data specifying subscriber defined alarm events (ALARM EVENT 1 425–ALARM EVENT N 435) and associated alarm parameters (PARAMETER 1 430–PARAMETER N 440).

Record 800 may additionally include a block of data 815 containing data identifying one or more contact methods (CONTACT 1 825–CONTACT N 835) and rankings (RANK 1 820–RANK N 830) associated with each one of the contact methods. Contact methods (CONTACT 1 825–CONTACT N 835) include data specifying contact identifiers for each subscriber, such as pager numbers, telephone numbers, or e-mail addresses. Rankings (RANK 1 820–RANK N 830), associated with each of the contact methods, include numerical data indicating the order server 110 should try the contact methods to reach the subscriber when an alarm event occurs. For example, CONTACT 1 825 may contain a phone number 222-555-1212 and RANK 1

820 may contain a ranking of 1. Further, CONTACT N 835 may contain a pager number 222-555-3333 and RANK N 830 may contain a ranking of 2. Thus, when an alarm event occurs, server 110 would first attempt to reach the subscriber via phone number 222-555-1212 before trying to reach the subscriber via pager number 222-555-3333.

Figure 9:
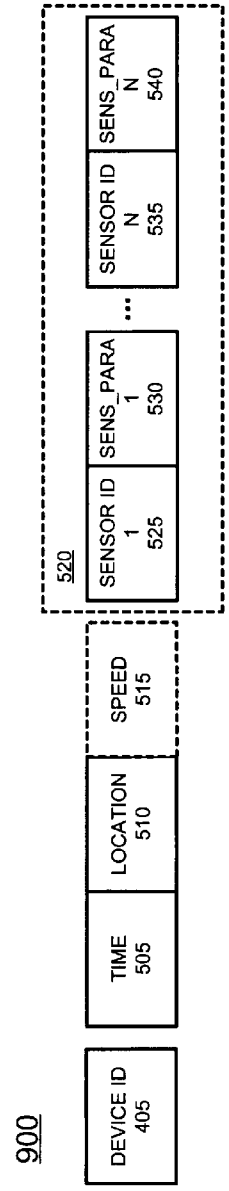
FIG. 9 illustrates an exemplary historical data record consistent with the present invention.

FIG. 9 illustrates a single exemplary historical data record 900, consistent with the present invention, of historical data records 710. Historical data record 900 may contain data received from a single data report from tracked device 105. Record 900 can contain a tracked device identifier (DEVICE ID 405) identifying a tracked device 105, a time parameter (TIME 505) indicating the time at which a report was received from a tracked device 105, a location parameter (LOCATION 510) indicating a geographic position where tracked device 105 was located at TIME 505, and an optional speed parameter (SPEED 515) indicating a speed of tracked device 105 at TIME 505.

Record 900 may further include a block of sensed alarm data 520 that contains data indicating sensor identifiers (SENS ID 1 525–SENS ID N 535) and associated sensed parameters (SENS_PARA 1 530–SENS_PARA N 540). Sensor identifiers (SENS ID 1 525–SENS ID N 535) contain data indicating a type of parameter sensed by sensor(s) 230 of tracked device 105 at TIME 505 (e.g., acceleration, oxygen, temperature, blood oxygen, pulse rate, or an emergency indicator). Sensed parameters (SENS_PARA 1 530–SENS_PARA N 540) contain data indicating the specific parameter sensed by sensor 230 of tracked device 105 at TIME 505.

Exemplary Subscription Processing

Figure 10:
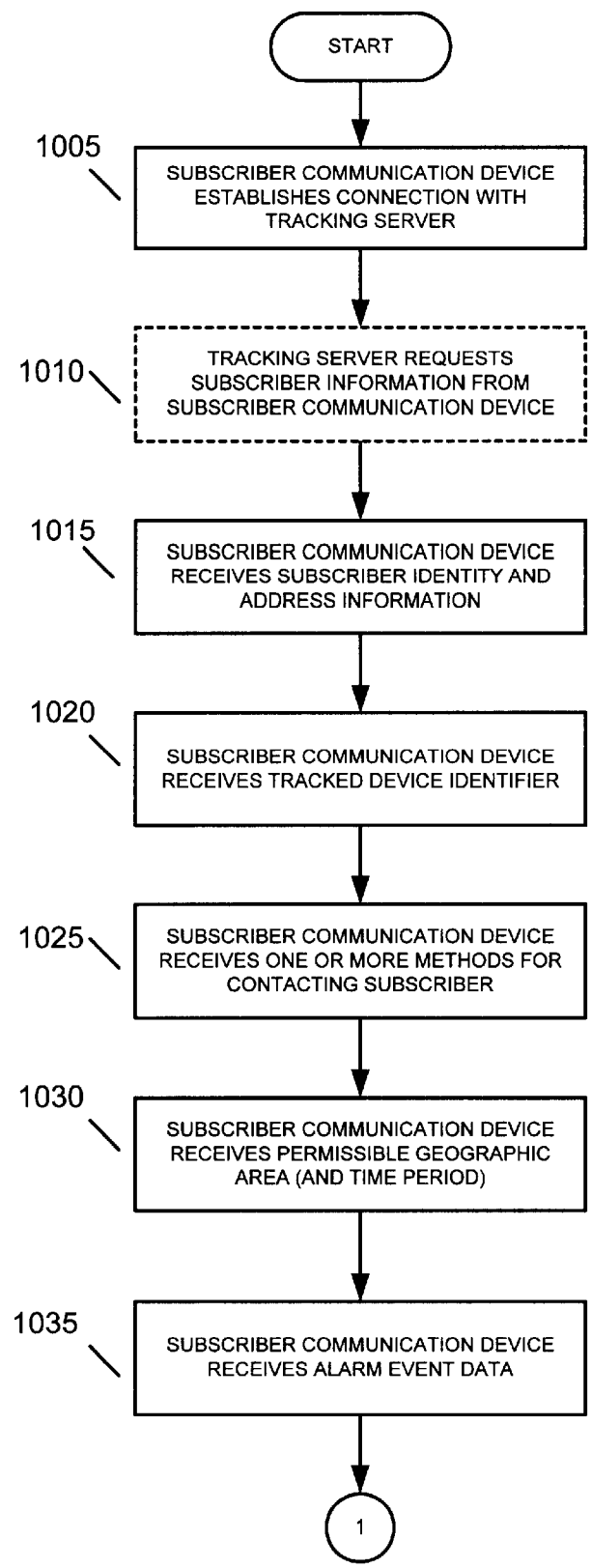
FIGS. 10–11, 14–19 and 21 illustrate flow charts of exemplary system processing consistent with the present invention.
Figure 11:
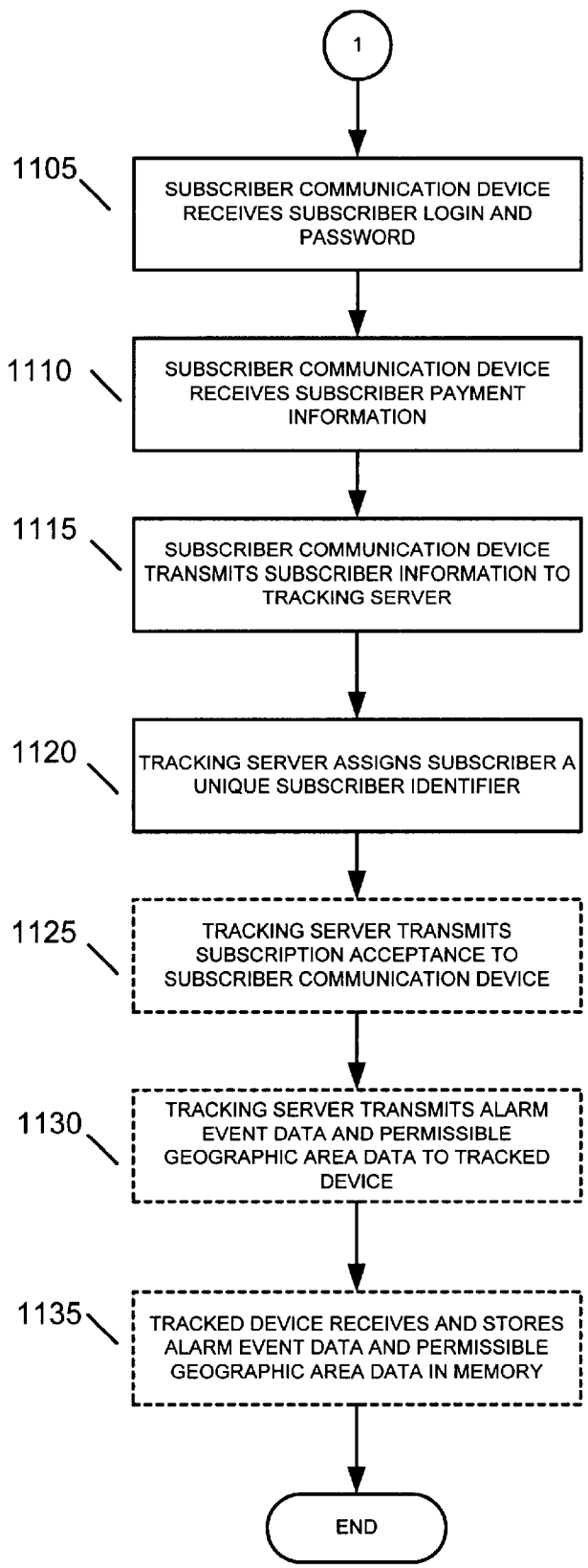

FIGS. 10–11 illustrate flow charts of exemplary processing, consistent with the present invention, for a subscriber to subscribe to the geo-location service provided by tracking server 110. As one skilled in the art will appreciate, the method exemplified by FIGS. 10–11 can be implemented as a sequence of instructions and stored in a memory of subscriber communication device 115.

For purposes of providing a specific example in the following flowcharts, assume that one of the subscriber communication devices 115 include a personal or portable computer having a "web" browser application and network 120 includes the Internet. One skilled in the art will appreciate, however, that subscriber communication devices 115 may also include other devices, such as a conventional phone, and network 120 may include other types of networks, such as the PSTN, and subscription processing may be implemented, in this case, using an automated phone system associated with tracking server 110.

Figure 12:
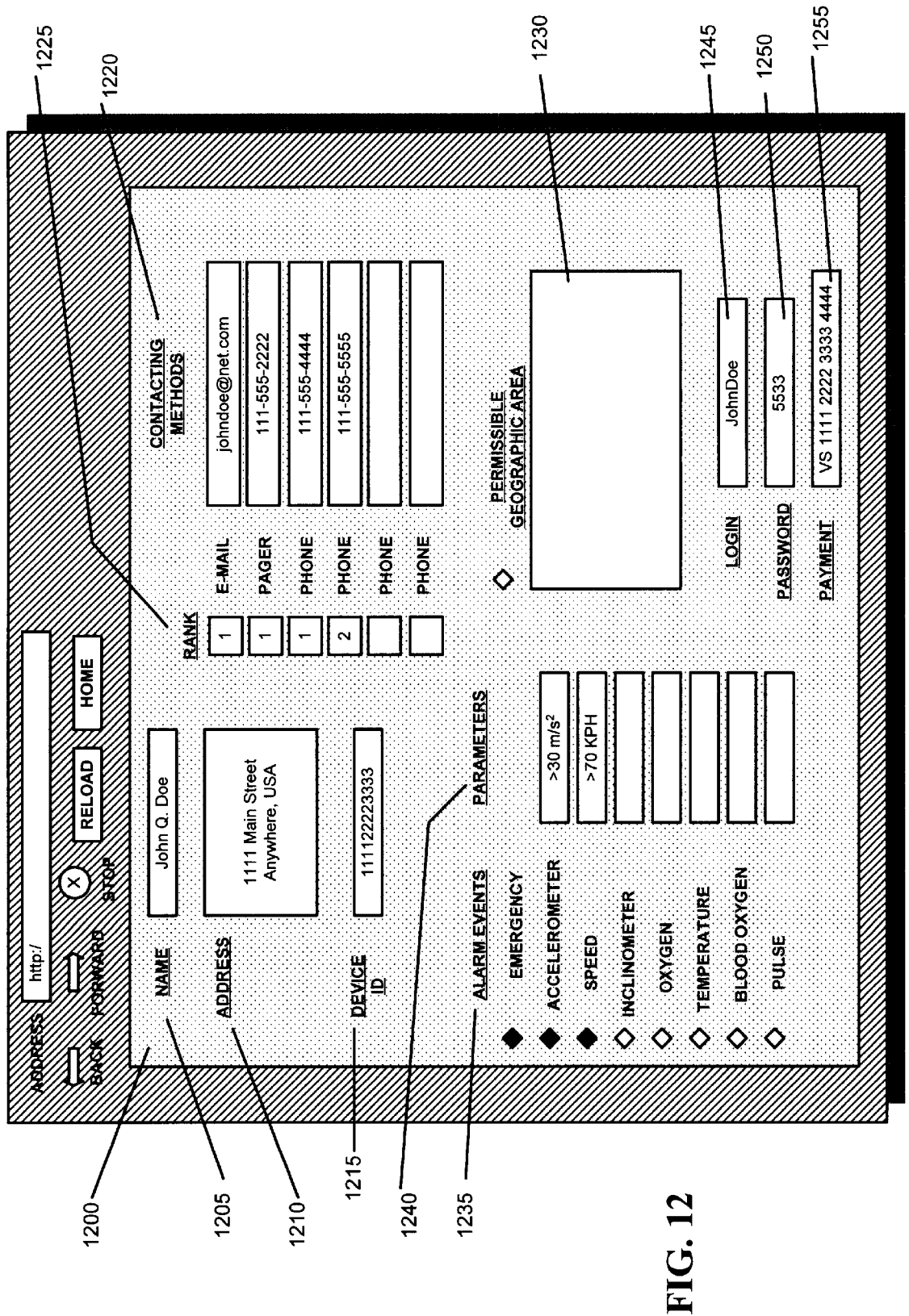
FIGS. 12–13 and 20 illustrate exemplary web browser pages consistent with the present invention.

Beginning at step 1005 (FIG. 10), subscriber communication device 115 establishes a connection with tracking server 110, via network 120, for the purpose of subscribing to the geo-location service provided by tracking server 110. For example, the subscriber communication device 115 may access a web site of the tracking server 110 in a conventional manner. FIG. 12 illustrates an exemplary web page 1200 of a web site of the tracking server 110.

The tracking server 110 may request subscriber information from subscriber communication device 115, possibly via the web page 1200 [step 1010]. The subscriber communication device 115 may automatically provide the requested information or may obtain the information from the subscriber via input device 225 [step 1015]. The subscriber communication device 115 may display a user interface, such as the web page 1200, to prompt the subscriber to provide information, such as the subscriber's name and address. For example, FIG. 12 illustrates subscriber entry of name "John Q. Doe" at name field 1205 and address "1111 Main Street Anywhere, USA" at address field 1210 of web page 1200.

Subscriber communication device 115 may also receive, from the subscriber, a tracked device identifier corresponding to a tracked device 105 currently possessed by the subscriber [step 1020]. As shown in FIG. 12, the subscriber enters "111122223333" at Device ID field 1215 of web page 1200. Subscriber communication device 115 may then receive, from the subscriber, one or more methods for contacting the subscriber, including optional rankings associated with each contact method [step 1025]. For example, the subscriber may enter four different contact numbers in the contacting method fields 1220 of web page 1200, as shown in FIG. 12. The subscriber may additionally enter a ranking in Rank fields 1225 for each contact number. The entered ranking may determine the order (e.g., sequential or simultaneous) in which tracking server 110 contacts the subscriber communication devices 115.

Figure 13:
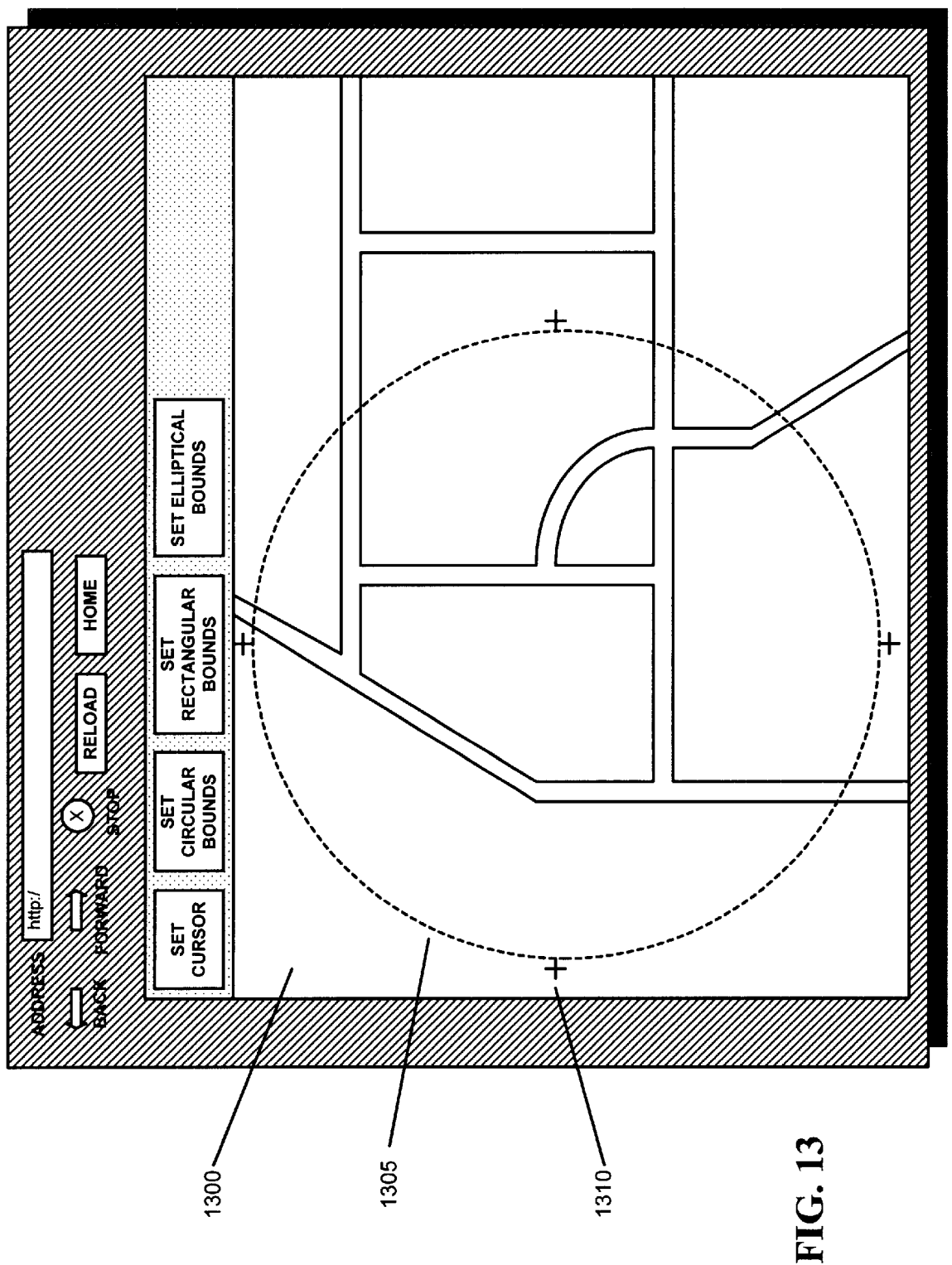

Subscriber communication device 115 additionally may receive permissible geographic area data 1230 (FIG. 12) for tracked device 105 [step 1030]. This permissible geographic area specifies geographic boundaries on the travel of tracked device 105. The permissible geographic area may be entered using numeric or textual data. FIG. 13 is an exemplary user interface that may be presented to the subscriber. As shown in FIG. 13, the permissible geographic area may further be entered graphically via, for example, a user interface, such as web page 1300. Using web page 1300, a subscriber may set a graphical boundary 1305 using cursors 1310 on a map of a subscriber selected geographic region.

Subscriber communication device 115 further receives alarm data and identifies the data as alarm event data 520 [step 1035]. Using web page 1200, for example, the subscriber may select one or more alarm events 1235, such as "emergency," "accelerometer," "speed, "inclinometer," "oxygen," "temperature," "blood oxygen," and "pulse" shown in FIG. 12. The subscriber may additionally enter parameters 1240 corresponding to each selected alarm event 1235.

"Emergency" may be used for notifying a subscriber when an emergency button is selected as tracked device 105 for the purpose of summoning help at a location of tracked device 105 in an emergency situation. "Accelerometer" may be used for notifying a subscriber when an accelerometer sensor of sensors 230 senses a high acceleration/deceleration rate at the tracked device 105 indicating, for example, a vehicle crash. "Speed" may be used for notifying a subscriber when a speed of the tracked device 105 exceeds a specified threshold. "Inclinometer" may be used when an inclinometer sensor of sensors 230 indicates, for example, a "man-down" emergency (e.g., an injured fireman falling to a prone position). "Oxygen" may be used when an oxygen sensor of sensors 230 indicates that a low oxygen level exists at tracked device 105. "Temperature" may be used when a temperature sensor of sensors 230 indicates that a high or low temperature condition exists at tracked device 105 (e.g., a child trapped in a trunk of a vehicle on a hot day). "Blood oxygen" and "Pulse" may be used when a blood oxygen sensor and pulse rate sensor of sensors 230 indicates an inappropriate health condition of an individual to which tracked device 105 has been attached (e.g., a medical patient being transferred among hospitals).

As a specific example, FIG. 12 illustrates subscriber John Q. Doe as selecting the "Emergency," "Accelerometer," and "Speed" alarm events 1235. John Q. Doe has further selected an acceleration/deceleration threshold of greater than 30 meters/second$^2$ (n/s$^2$) and a speed threshold of greater than 70 kilometers per hour (KPH).

Subscriber communication device 115 receives the desired login and password [step 1105] (FIG. 11) and the payment information, if necessary, entered by the subscriber [step 1110]. As shown in the example of FIG. 12, subscriber John Q. Doe has entered a login 1245 "JohnDoe," a password 1250 "5533," and payment data 1255 indicating payment by a VISA credit card number "1111 2222 3333 4444." The subscriber indicates at web page 1200 when data entry is complete and subscriber communication device 115 transmits the entered subscriber information to tracking server 110 [step 1115].

In response to receipt of the subscriber information from subscriber communication device 115, tracking server 110 assigns the subscriber a unique subscriber identifier (SUBSCRIB ID 805) and stores the received subscriber information as a record 800 in database 635 [step 1120]. After storing the subscriber information, tracking server 110 may transmit a subscription acceptance message to subscriber communication device 115 [step 1125]. Tracking server 110 may further transmit alarm event data 420, time period (TIME PERIOD 415), and permissible geographic area (PERM_GEO_AREA 410) data to tracked device 105 [step 1130]. Tracked device 105 receives and stores the alarm event data 420, TIME PERIOD 415, and PERM_GEO_AREA 410 data in record 400 of subscription information records 305 [optional step 1135].

Exemplary Geo-location/Sensor Data Processing/ Reporting

Figure 14:
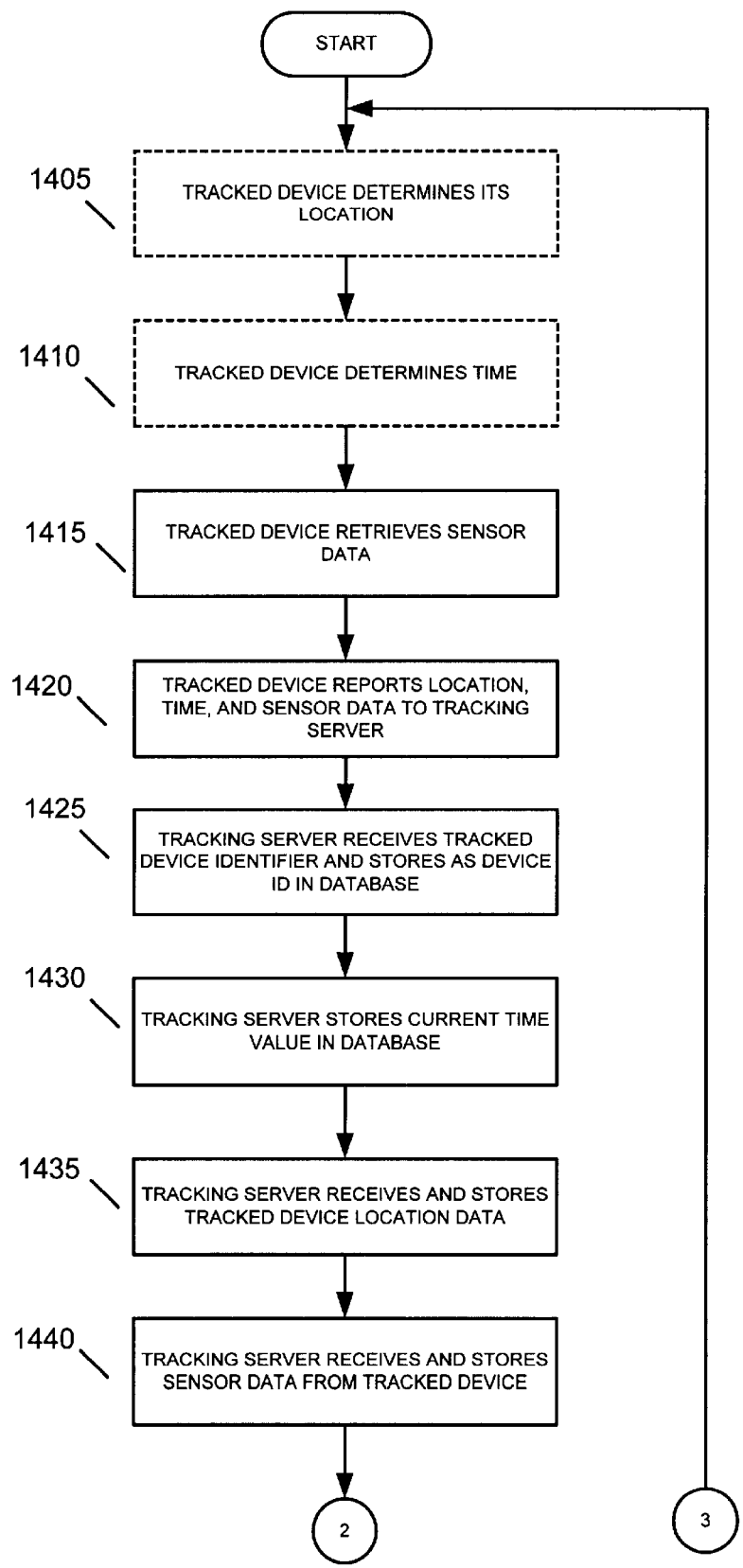
Figure 15:
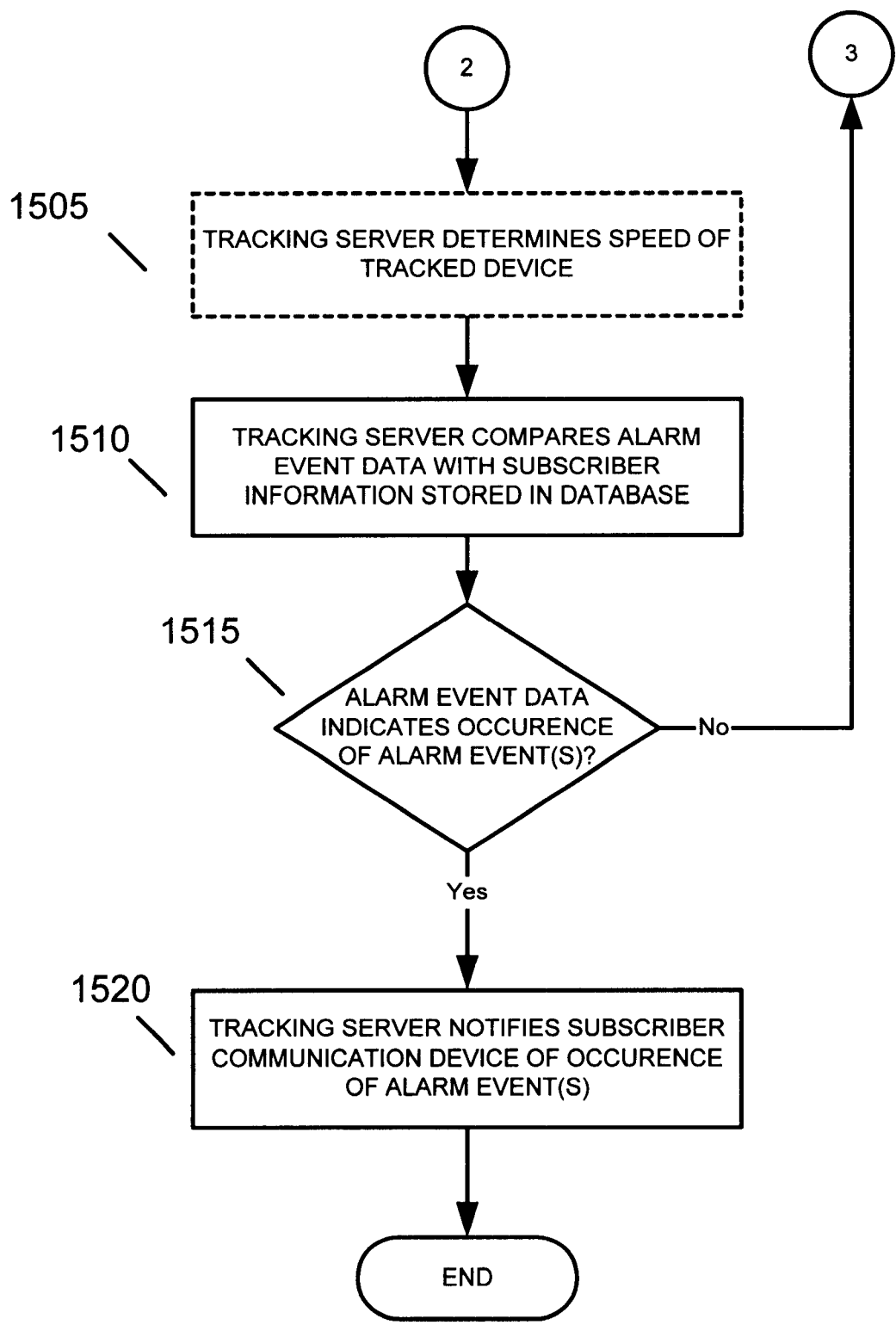

FIGS. 14–15 illustrate flow charts of exemplary processing, consistent with the present invention, for processing geo-location and sensor data at tracked device 105 and reporting the data to tracking server 110 on a continuous or periodic basis. Beginning at optional step 1405, tracked device 105 may determine its location using GPS receiver 215. Alternatively, if tracked device consists of a cell phone, and network 120 includes a cellular network, network 120 can determine the location of the cell phone using techniques well known in radio communications systems, such as the triangulation of signal strengths at three or more cellular network base stations. Network 120 can then supply the determined location to tracking server 110.

Tracked device 105 then may optionally determine a current time [step 1410] using, for example, an internal clock (not shown) associated with processing unit 235. Tracked device retrieves sensor data (sensor data 625) from the one or more sensors 230 [step 1415] and transmits a tracked device 105 unique device identifier (DEVICE ID 405), a current device location (LOCATION 510), current sensor data (sensor data 520) and a current time (TIME 505) to tracking server 110 via network 120 [step 1420].

Tracking server 110 receives the device unique identifier from tracked device 105 and stores it as DEVICE ID 405 in record 900 of database 635 [step 1425]. Tracking server 110 receives the current time value TIME 505 from tracked device 105 and stores it as TIME 505 in record 900 of database 635 [step 1430]. Tracking server 110 then receives tracked device location data either from tracked device 105 or from network 120 [step 1435]. After receipt of the location of tracked device 105, tracking server 110 stores the data as LOCATION 510 in record 900 of database 635 [step 1435]. Tracking server 110 then receives sensor data 520 from tracked device 105 and stores the data in database 635 [step 1440]. Tracking server 110 may also optionally determine the speed of tracked device 105 and store as SPEED 515 in record 900 of database 635 [step 1505] (FIG. 15).

Tracking server 110 compares the received sensor data 520 with the subscriber information 705 stored in database 635 [step 1510]. Based on this comparison, tracking server 110 determines whether the sensor data indicates an occurrence of one or more alarm events [step 1515]. If the comparison indicates that no alarm events have occurred, then processing returns to step 1405. If the comparison indicates an occurrence of an alarm event, then tracking server 110 notifies subscriber communication device(s) 115 of the occurrence of the alarm event [step 1520] using the contact data 815 stored in database 635.

As a specific example, assume that tracked device 105 resides within a vehicle traveling on a freeway. At time $t_1$, tracked device 105 uses GPS receiver 215 to determine that the vehicle is currently located at X degrees, Y minutes longitude and W degrees, Z minutes latitude. Using its internal clock, tracked device 105 additionally determines that the current time is 5:05pm. Tracked device 105 retrieves accelerometer sensor data from sensor 230 indicating that the vehicle is accelerating at a rate of 25 m/s$^2$. Tracked device 105 then transmits its device identifier "11556677," current device location X degrees, Y minutes longitude and W degrees, Z minutes latitude, accelerometer sensor data 25 m/s$^2$ and current time of 5:05pm to tracking server 110.

Tracking server 110 receives and stores the transmitted device identifier, current device location, accelerometer sensor data and current time in database 635. Tracking server 110 additionally retrieves location data from a previous report from tracked device 105 at time $t_0$, and calculates a current speed of the vehicle as 50 KPH. Tracking server 110 then compares the received data with permissible geographic area (PERM_GEO_AREA 410), time period (TIME PERIOD 415) and alarm data 420 contained in record 800 of database 635. Assuming that ALARM EVENT 1 425 of alarm data 420 indicates "speed" and PARAMETER 1 430 indicates "75 KPH," then the calculated speed does not indicate the occurrence of an alarm event. Assuming that ALARM EVENT N 435 of alarm data 420 indicates "acceleration" and PARAMETER N 440 indicates "20 m/s$^2$," then the acceleration data of 25 m/s$^2$ reported from tracked device 105 does indicate the occurrence of an alarm event. Tracking server 110, therefore, notifies subscriber communication device 115 of the occurrence of the excessive acceleration of the vehicle.

Figure 16:
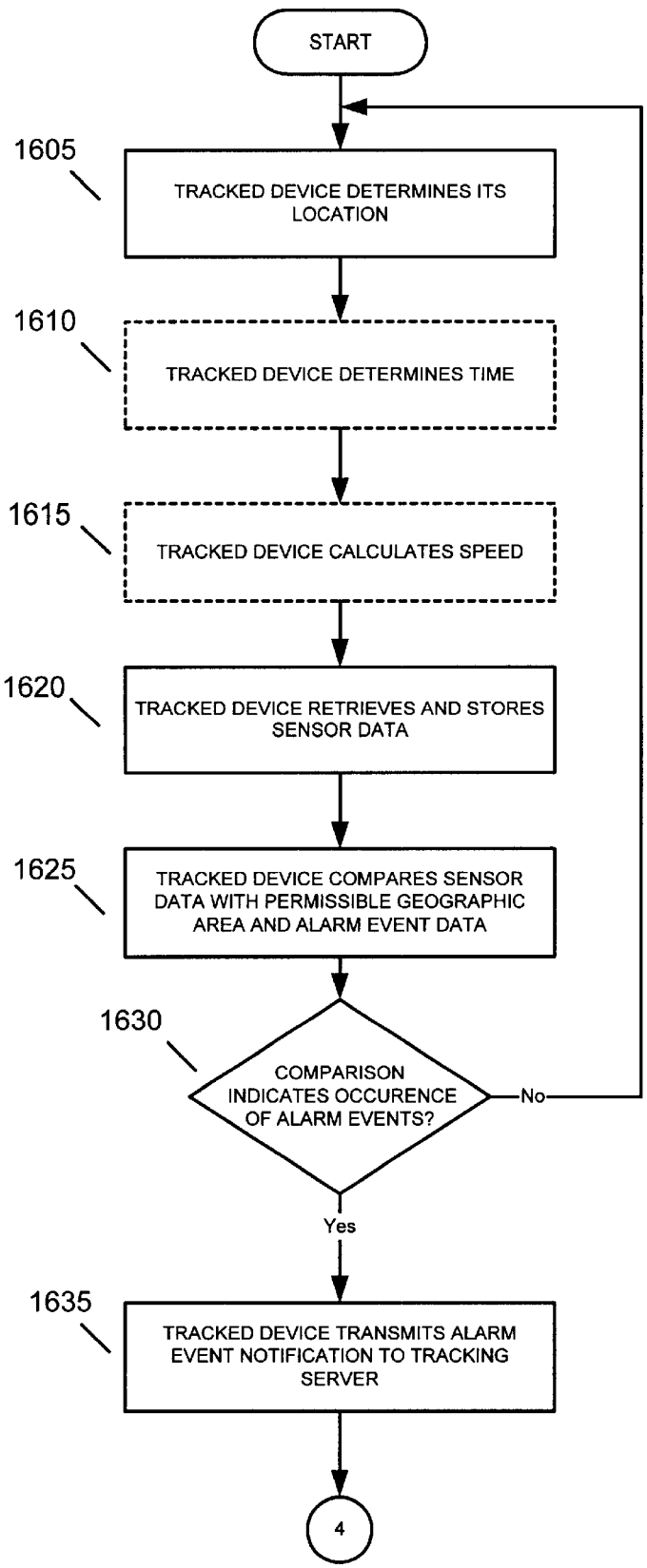
Figure 17:
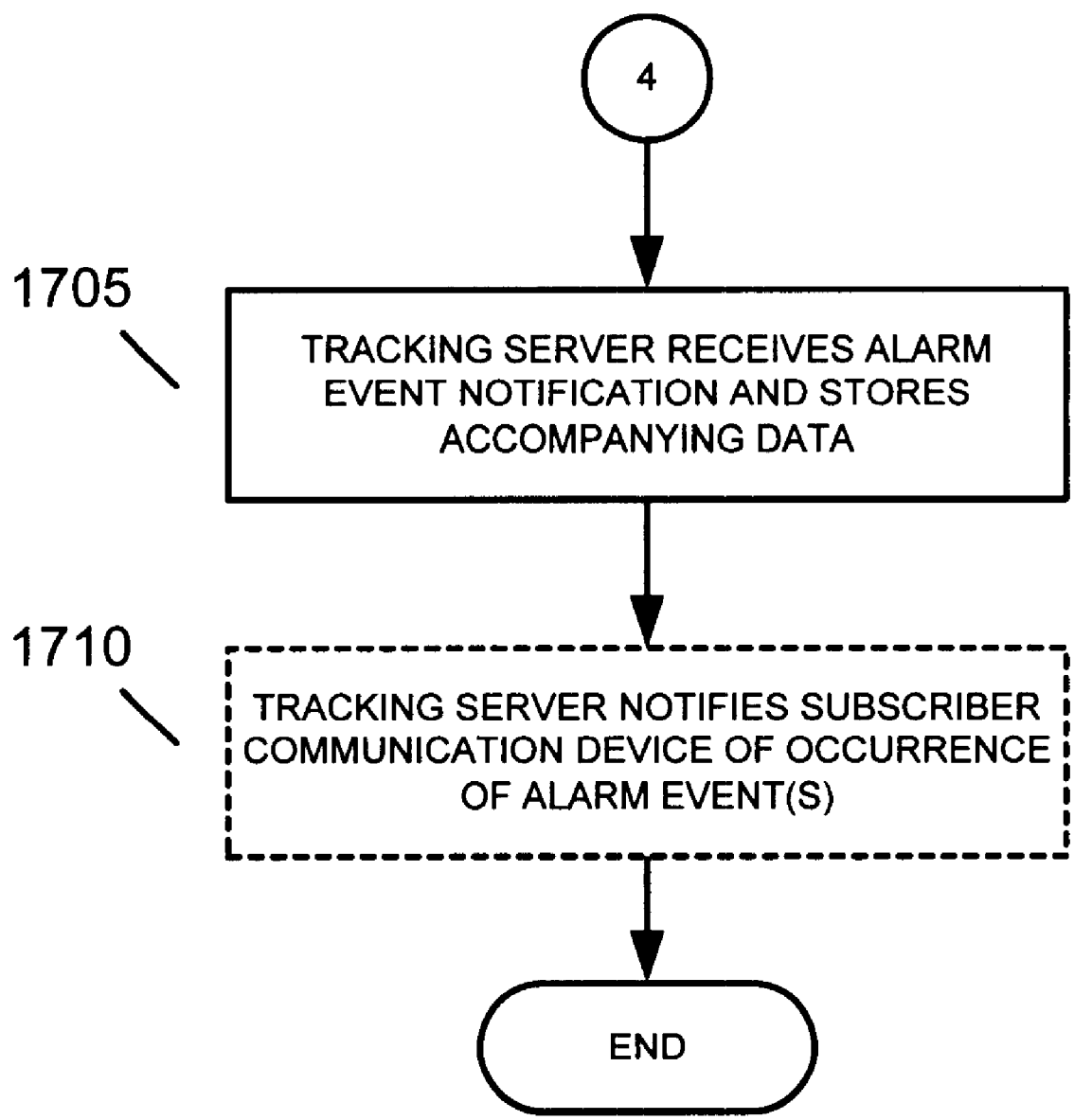

FIGS. 16–17 illustrate flow charts of exemplary processing, consistent with the present invention, for processing geo-location and sensor data at tracked device 105 and reporting the data to server 110 on an alarm-event-driven basis, instead of a continuous or periodic basis as described above with respect to FIGS. 14–15.

Beginning at optional step 1605, tracked device 105 may determine its current location (LOCATION 510) using GPS receiver 215. Tracked device 105 then may optionally determine a current time [step 1610] using, for example, an internal clock (not shown) associated with processing unit 235. Tracked device 105 may also calculate the device's speed [optional step 1615]. Tracked device 105 retrieves and stores sensor data 520 from the one or more sensors 230 [step 1620].

Tracked device 105 then compares the location and sensor data with permissible geographic area data (PERM_GEO_AREA 410), time period data (TIME PERIOD 415) and alarm data 420 previously received from tracking server 110 [step 1625]. If the comparison does not indicate the occurrence of one or more alarm events, then processing returns to step 1605. If the comparison does indicate the occurrence of one or more alarm events, then tracked device transmits an alarm notification to tracking server 110 [step 1635]. The alarm notification indicates which alarm event(s) have occurred, and may further include unique device identifier, time, location, and sensor data. Tracking server 110 receives the alarm event notification and stores the accompanying data in database 335 [step 1705] (FIG. 17). Tracking server 110 may optionally notify subscriber communication device(s) 115 of the occurrence of one or more alarm event(s) [step 1710] using the contact data 815 stored in database 635.

As a specific example, assume again that tracked device 105 resides within a vehicle traveling on a freeway. At time $t_1$, tracked device 105 uses GPS receiver 215 to determine that the vehicle is currently located at X degrees, Y minutes longitude and W degrees, Z minutes latitude. Using its internal clock, tracked device 105 additionally determines that the current time to is 7:05pm. Tracked device 105 retrieves previously determined location data from database 270 and calculates a current speed of the vehicle as 80 KPH. Tracked device 105 additionally retrieves accelerometer sensor data from sensor 230 indicating that the vehicle is accelerating at a rate of 15 m/s$^2$.

Tracked device 105 compares the location, calculated speed and accelerometer sensor data with the permissible geographic area (PERM_GEO_AREA 410), time period (TIME PERIOD 415) and alarm data 420 stored in record 400 of database 270. Assuming that ALARM EVENT 1 425 of alarm data 420 indicates "speed" and PARAMETER 1 430 indicates "75 KPH," then the calculated speed of 80 KPH indicates the occurrence of an alarm event. Assuming that ALARM EVENT N 435 of alarm data 420 indicates "acceleration" and PARAMETER N 440 indicates "20 m/s$^2$," then the acceleration data of 15 m/s$^2$ does not indicate the occurrence of an alarm event. Tracked device 105, therefore, notifies tracking server 110 of the occurrence of the excessive speed of the vehicle. This alarm event notification includes the tracked device's device identifier "11556677," current device location X degrees, Y minutes longitude and W degrees, Z minutes latitude, accelerometer sensor data 15 m/s$^2$, speed of 80 KPH, and time of 7:05pm.

Tracking server 110 receives and stores the transmitted device identifier, current device location, accelerometer sensor data, speed data and current time in database 335. Tracking server 110 subsequently may notify subscriber communication device 115 of the occurrence of the excessive speed of the vehicle.

Exemplary Subscriber Device Geo-location Data Processing

Figure 18:
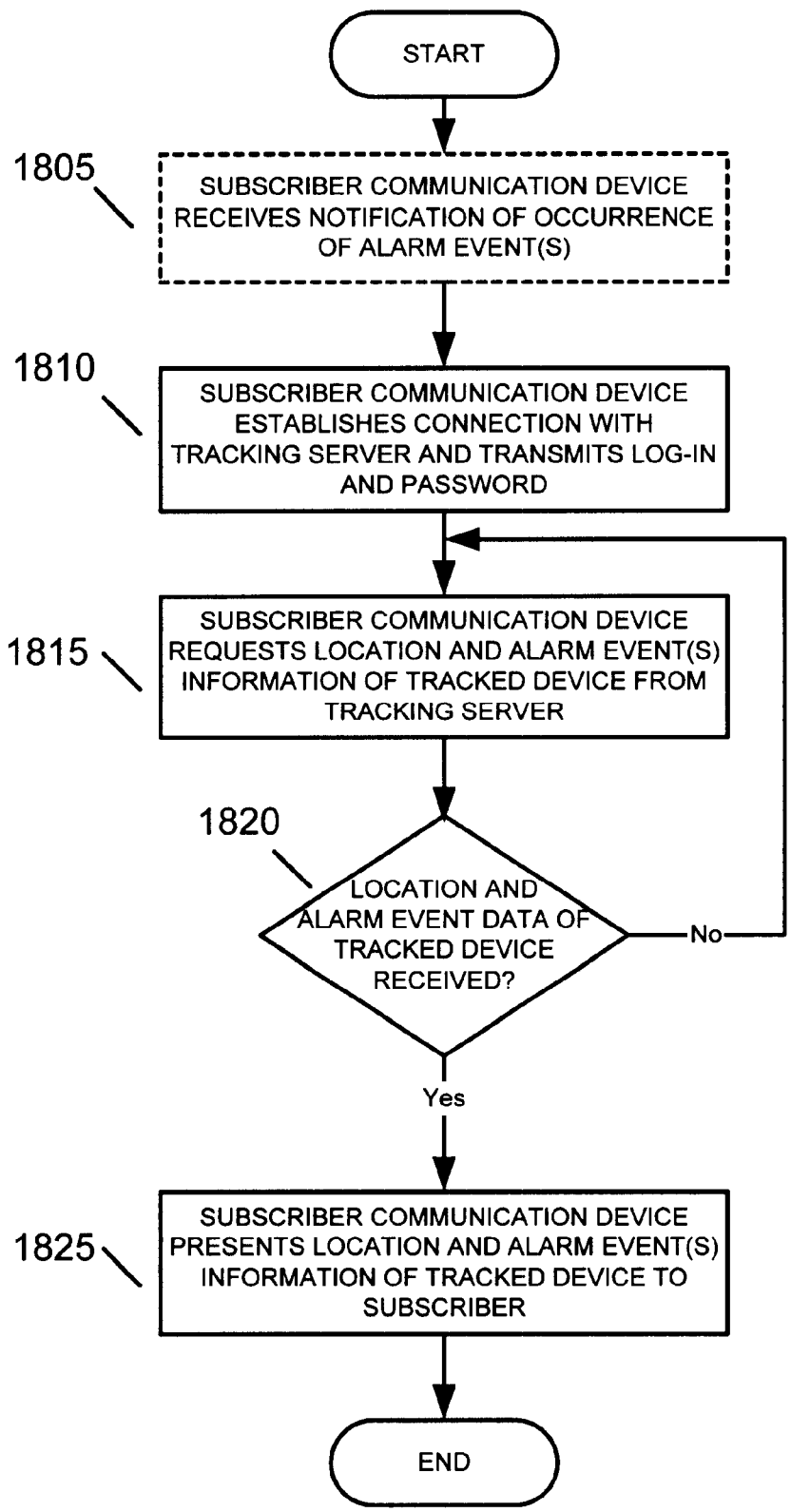

FIG. 18 illustrates a flow chart of exemplary processing, consistent with the present invention, for receiving and processing geo-location data at subscriber communication device 115. In the implementation illustrated in FIG. 18, subscriber communication device 115 initiates a request of location and alarm event information from tracking server 110.

Subscriber communication device(s) 115 may first receive a notification of an occurrence of one or more alarm events from tracking server 110 [step 1805]. In response to subscriber input, subscriber communication device(s) 115 establishes a connection with tracking server 110 and transmits the subscriber's login and password [step 1810]. Subscriber communication device(s) 115 requests location and alarm event data of tracked device 105 from tracking server 110 [step 1815]. Subscriber communication device(s) 115 then determines if the requested location and alarm event data has been received from racking server 110 in response to the request [step 1820]. If not, device 115 re-requests the data at step 1815. If the requested location and alarm event(s) data has been received, then subscriber communication device 115 presents the location and alarm event(s) information of tracked device 105 to the subscriber [step 1825].

Figure 19:
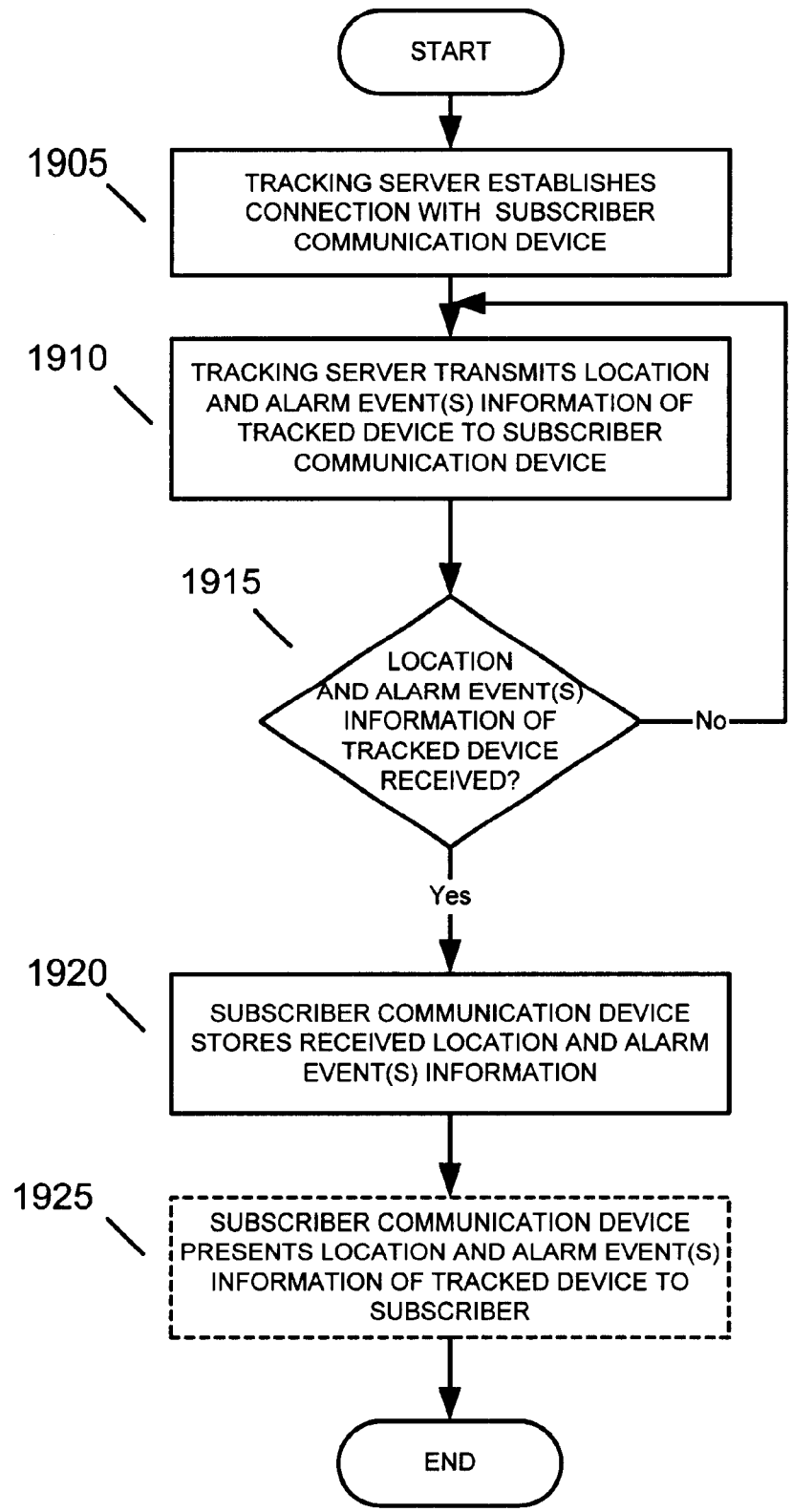

FIG. 19 illustrates a flow chart of exemplary processing, consistent with the present invention, for receiving and processing geo-location data at subscriber communication device 115. In the implementation illustrated in FIG. 19, tracking server 110 initiates the establishment of a connection with subscriber communication device 115 [step 1905]. After establishment of the connection, tracking server 110 transmits location and alarm event(s) information of tracked device 105 to subscriber communication device 115 [step 1910]. Tracking server 110 then determines if the transmitted location and sensor data has been received at subscriber communication device 115 [step 1915]. If not, device 115 re-retransmits the information at step 1910. If the requested location and alarm event(s) information has been received, subscriber communication device 115 stores the information in memory [step 1920]. Subscriber communication device 115 then may present the location and alarm event(s) information of tracked device 105 to the subscriber [step 1925].

As a specific example of the exemplary implementations illustrated in FIGS. 18–19, assume that one of the subscriber communication devices 115 includes a personal or portable computer having a "web" browser application and network 120 includes the Internet. One skilled in the art, however, will appreciate that subscriber communication devices 115 may also include other type of devices, such as a conventional phone, and network 120 may include other types of networks, such as the PSTN. Location and sensor data can, therefore, be provided to subscriber communication device 115 via PSTN using an automated phone system associated with tracking server 110.

Figure 20:
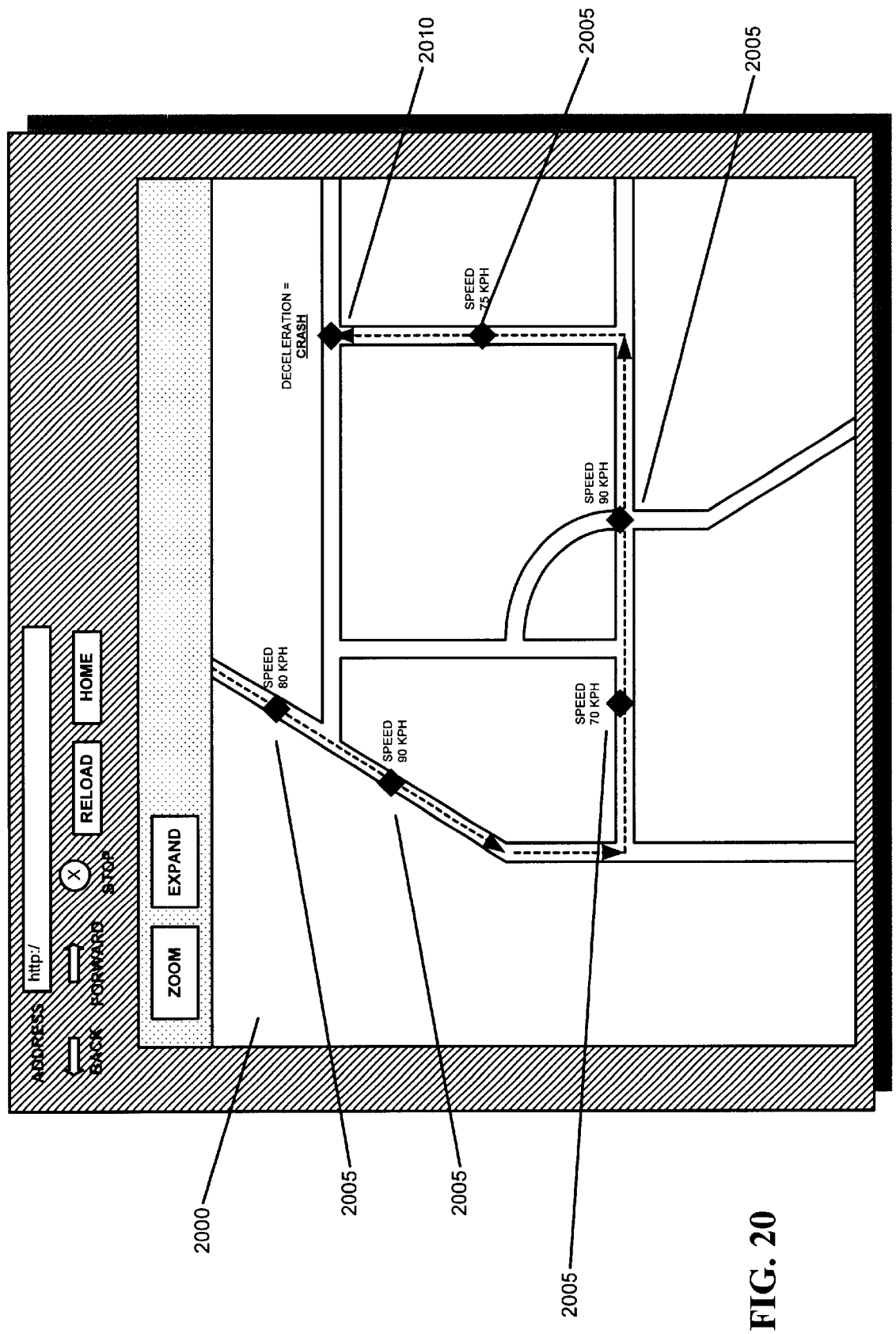

FIG. 20 illustrates an exemplary web page 2000 showing a historical "track" of the path of tracked device 105. Alarm events 2005 indicating excessive speeds are graphically illustrated. Also, an alarm event 2010 indicating excessive deceleration (e.g., a vehicular crash) is graphically illustrated. Though web page 2000 of FIG. 20 illustrates a historical "track" of the path of tracked device 105, web page 2000 may also present data showing the location of tracked device 105 in real-time.

Exemplary Processing for Transmitting Messages to the Tracked Device

Figure 21:
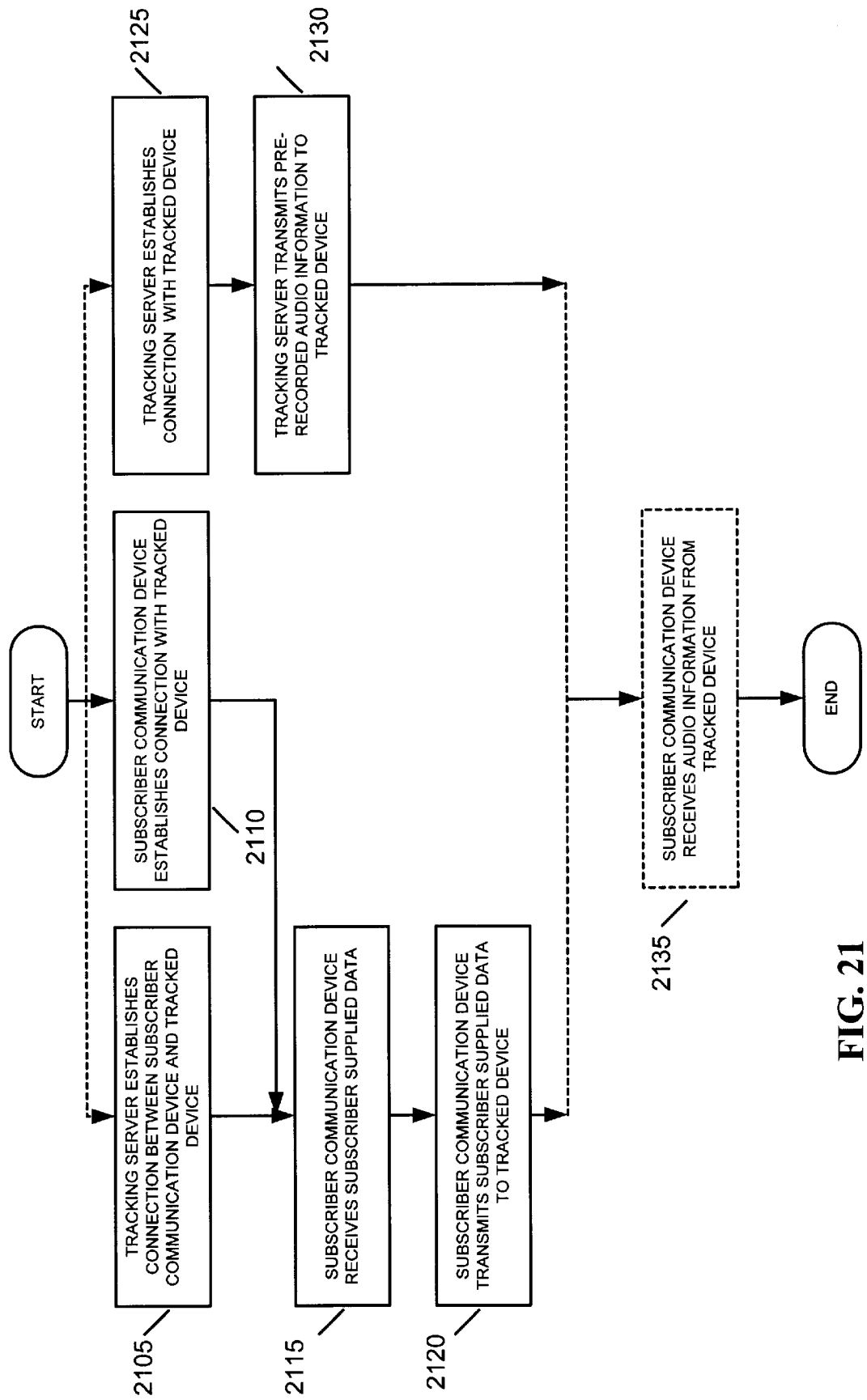

FIG. 21 illustrates a flow chart of exemplary processing, consistent with the present invention, for transmitting messages to tracked device 105. Tracking server 110 may establish a connection between subscriber communication device 115 and tracked device 105 via network 120 [step 2105]. Alternatively, subscriber communication device 115 can establish a connection with tracked device 105 via network 120 [step 2110].

Subscriber communication device 115 then may receive data from the subscriber via a user interface of the device [step 2115]. Subscriber communication device 115 transmits the subscriber-supplied data to tracked device 105 [step 2120]. For example, a subscriber may enter audio data into device 115, such as an audio message "You are going too fast" that can be played at tracked device 105.

Alternatively, tracking server 110 may establish a connection with tracked device 105 [step 2125] and transmit pre-recorded audio information to tracked device 105 [step 2130]. For example, an audio message such as "You are going too fast" can be stored at tracking server 110. In response to the occurrence of an alarm event, tracking server 110 can transmit the audio message to tracked device 105.

Optionally, at step 2135, subscriber communication device 115 may receive audio data from tracked device 105. For example, subscriber communication device 115 can output audio data received from tracked device 105 so that a subscriber is able to listen to the audio environment existing at tracked device 105. Alternatively, audio data received from tracked device 105 can be recorded at tracking server 110, or subscriber communication device 115, for later playback by the subscriber.

Conclusion

Systems and methods consistent with the present invention provide a geo-location tracking service that enables service subscribers to tailor the monitored parameters of a tracked device parameters to fit their particular requirements. Additionally, systems and methods consistent with the present invention provide a tracking server that permits subscribers to obtain remote access to tracked device data stored at the server via a network which interconnects the subscribers with the tracking server.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of steps have been described with regard to FIGS. 10–11, 14–19 and 21, the order of the steps is not critical. The scope of the invention is defined by the following claims and their equivalents.

What is claimed is:

1. A graphical user interface for subscribing to a tracking and notification service, the graphical user interface manipulating data entry groups that perform actions on a database, comprising:
    a first activation area on the graphical user interface for activating creation of a first data entry group, a first graphical area associated with said first data entry group requesting identifier information of a subscriber of said tracking and notification service, said first data entry group accepting user entry of said subscriber identifier information upon activation; and
    a second activation area on the graphical display activating creation of a second data entry group, a second graphical area associated with said second data entry group displaying a plurality of alarm conditions associated with a device, said second data entry group accepting user selection of one or more of said plurality of alarm conditions upon activation; and
    a third activation area on the graphical display for activating creation of a third data entry group, a third graphical area associated with said third data entry group requesting data indicating one or more permissible geographic areas, said permissible geographic areas specifying boundaries on a location of said device, said third data entry group accepting user entry of said one or more permissible geographic areas upon activation.

2. The graphical user interface of claim 1, further comprising:
    a fourth activation area on the graphical display for activating creation of a fourth data entry group, a fourth graphical area associated with said fourth data entry group requesting parameters for each user selected alarm condition, said parameters specifying limits on said alarm conditions, said fourth data entry group accepting user entry of said parameters upon activation.

3. The graphical user interface of claim 1, further comprising:
    a fourth activation area on the graphical display for activating creation of a fourth data entry group, a fourth graphical area associated with said fourth data entry group requesting data indicating one or more methods of contacting said subscriber, said fourth data entry group accepting user entry of said one or more contact methods upon activation.

4. A data structure encoded on a computer readable medium, comprising:
    first data indicating an identity of a subscriber of a tracking service;
    second data indicating one or more subscriber selected and defined alarm conditions, said alarm conditions indicating conditions under which one or more alarm events associated with a device occur, the one or more alarm events corresponding to at least one of an environment, movement, and operation of the device;
    third data indicating one or more methods of contacting said subscriber in the event said one or more alarm events occur; and
    fourth data indicating a permissible geographic area associated with said device.

5. The data structure of claim 4, wherein said third data further indicates one or more methods of contacting said subscriber in the event said device roams outside of said permissable geographic area.

6. The data structure of claim 5, further comprising:
    fifth data associated with said one or more methods of contacting said subscriber, said fifth data indicating an order of selecting said one or more methods when contacting said subscriber.

7. A system for notifying a subscriber of an event notification service of an occurrence of one or more alarm events, comprising:
    means for receiving subscriber identity data identifying a subscriber of said service;
    means for receiving one or more subscriber selected and defined alarm conditions;
    means for receiving data associated with at least one of an environment, movement, and operation of a first communication device;
    means for comparing said data with said alarm conditions to determine an occurrence of one or more alarm events; and
    means for communicating an alarm event notification to the subscriber at a second communication device based on said comparison,
    wherein said one or more subscriber defined alarm conditions includes one or more geographic boundaries associated with a location of said first communication device.

8. A method of notifying a subscriber of an event notification service of an occurrence of one or more alarm events, comprising:

receiving subscriber identity data identifying a subscriber of said service;

receiving one or more subscriber selected and defined alarm conditions;

receiving data associated with at least one of an environment, movement, and operation of a first communication device;

comparing said data with said alarm conditions to determine an occurrence of one or more alarm events; and communicating an alarm event notification to the subscriber at a second communication device based on said comparison, wherein said one or more subscriber defined alarm conditions includes one or more geographic boundaries associated with a location of said first communication device.

9. The method of claim 8, wherein said data comprises at least one of acceleration, oxygen level, temperature, pulse rate, and blood oxygen level data.

10. The method of claim 8, further comprising:

receiving sensor data from sensors associated with said first communication device.

11. The method of claim 10, further comprising:

comparing said sensor data with said alarm conditions to determine an occurrence of one or more alarm events; and communicating an alarm event notification to the subscriber at said second communication device based on said comparison.

12. The method of claim 8, wherein said one or more subscriber defined alarm conditions includes time period data corresponding to each of said one or more geographic boundaries.

13. A tracking server, comprising:

a memory configured to store instructions; and a processor configured to:

receive subscriber identity data identifying a subscriber of said service;

receive one or more subscriber selected and defined alarm conditions;

receive data associated with at least one of an environment, movement and operation of a first communication device;

compare said data with said alarm conditions to determine an occurrence of one or more alarm events; and communicate an alarm event notification to a second communication device based on said comparison, wherein said one or more subscriber defined alarm conditions includes one or more geographic boundaries associated with a location of said first communication device.

14. A computer-readable medium containing instructions for controlling at least one processor to perform a method of notifying a subscriber of an event notification service of an occurrence of one or more alarm events, comprising:

receiving subscriber identity data identifying a subscriber of said service;

receiving one or more subscriber selected and defined alarm conditions;

receiving data associated with at least one of an environment, movement and operation of a first communication device;

comparing said data with said alarm conditions to determine an occurrence of one or more alarm events; and communicating an alarm event notification to the subscriber at a second communication device based on said comparison, wherein said one or more subscriber defined alarm conditions includes one or more geographic boundaries associated with a location of said first communication device.

15. A method of notifying a subscriber of an event notification service of an occurrence of one or more alarm events, comprising:

receiving data associated with at least one of an environment, movement and operation of a first communication device;

comparing said data with subscriber-selected and defined alarm conditions; and communicating an alarm event notification to a second communication device based on said comparison, wherein said second communication device is selected from a plurality of subscriber-designated communication devices, wherein said subscriber-selected alarm conditions include one or more geographic boundaries associated with a location of said first communication device.

16. The method of claim 15, wherein said data is associated with at least one of an acceleration, an oxygen level, a temperature, a pulse rate, and a blood oxygen level.

17. The method of claim 15, further comprising:

receiving sensor data from sensors associated with said first communication device.

18. The method of claim 17, further comprising:

comparing said sensor data with said subscriber-selected alarm conditions; and communicating an alarm event notification to a second communication device based on said comparison, wherein said second communication device is selected from a plurality of subscriber-designated communication devices.

19. The method of claim 15, wherein said subscriber-selected alarm conditions includes time period data corresponding to each of said one or more geographic boundaries.

20. A computer-readable medium containing instructions for controlling at least one processor to perform a method of notifying a subscriber of an event notification service of an occurrence of one or more alarm events, comprising:

receiving data associated with at least one of an environment, movement and operation of a first communication device;

comparing said data with subscriber-selected and defined alarm conditions; and communicating an alarm event notification to a second communication device based on said comparison, wherein said second communication device is selected from a plurality of subscriber-designated communication devices, wherein said subscriber-selected alarm conditions include one or more geographic boundaries associated with a location of said first communication device.

21. A first communication device, comprising:

a memory configured to store executable instructions; and at least one processor configured to:

receive data associated with at least one of an environment, movement and operation of a second communication device;

compare said data with subscriber-selected and defined alarm conditions; and communicate an alarm event notification to a third communication device based on said comparison, wherein said third communication device is selected from a plurality of subscriber-designated communication devices, wherein said subscriber-selected alarm conditions include one or more geographic boundaries associated with a location of said first communication device.

22. A method of tracking a communication device, comprising:

receiving a set of subscriber-defined alarm conditions associated with said communication device;

receiving location and sensor data associated with the communication device;

comparing said location and sensor data with each alarm condition of said set of subscriber-defined alarm conditions; and indicating an occurrence of one or more alarm events based on said comparison.

23. A computer-readable medium containing instructions for controlling at least one processor to perform a method of tracking a communication device, comprising:

receiving a set of subscriber-defined alarm conditions associated with said communication device;

receiving location and sensor data associated with the communication device;

comparing said location and sensor data with each alarm condition of said set of subscriber-defined alarm conditions; and indicating an occurrence of one or more alarm events based on said comparison.

24. A first communication device, comprising:

a memory configured to store executable instructions; and at least one processor configured to:

receive a set of subscriber-defined alarm conditions associated with a second communication device;

receive location and sensor data associated with the second communication device;

compare said location and sensor data with each alarm condition of said set of subscriber-defined alarm conditions; and indicate an occurrence of one or more alarm events based on said comparison.

25. A method of notifying a subscriber of an event notification service of an occurrence of one or more alarm events, comprising:

receiving subscriber identity data identifying a subscriber of said service;

receiving one or more subscriber selected and defined alarm conditions;

receiving data associated with at least one of an environment, movement, and operation of a first communication device, wherein said data comprises at least one of oxygen level, pulse rate, and blood oxygen level data;

comparing said data with said alarm conditions to determine an occurrence of one or more alarm events; and communicating an alarm event notification to the subscriber at a second communication device based on said comparison.

26. A method of notifying a subscriber of an event notification service of an occurrence of one or more alarm events, comprising:

receiving data associated with at least one of an environment, movement and operation of a first communication device, wherein said data is associated with at least one of an oxygen level, a pulse rate, and a blood oxygen level;

comparing said data with subscriber-selected and defined alarm conditions; and communicating an alarm event notification to a second communication device based on said comparison, wherein said second communication device is selected from a plurality of subscriber-designated communication devices.

27. A first communication device, comprising:

a memory configured to store executable instructions; and at least one processor configured to:

receive data associated with at least one of an environment, movement and operation of a second communication device, wherein said data is associated with at least one of an oxygen level, a pulse rate, and a blood oxygen level;

compare said data with subscriber-selected and defined alarm conditions; and communicate an alarm event notification to a third communication device based on said comparison, wherein said third communication device is selected from a plurality of subscriber-designated communication devices.

* * * * *

(12) EX PARTE REEXAMINATION CERTIFICATE (9791st)
United States Patent
Elliott

(10) Number: US 6,509,830 C1
(45) Certificate Issued: Aug. 9, 2013

(54) SYSTEMS AND METHODS FOR PROVIDING CUSTOMIZABLE GEO-LOCATION TRACKING SERVICES

(75) Inventor: Brig Barnum Elliott, Arlington, MA (US)

(73) Assignee: BBN Technologies Corp., Cambridge, MA (US)

Reexamination Request:
No. 90/011,589, Jun. 29, 2011

Reexamination Certificate for:
Patent No.: 6,509,830
Issued: Jan. 21, 2003
Appl. No.: 09/586,457
Filed: Jun. 2, 2000

(51) Int. Cl.
*G08B 9/00* (2006.01)

(52) U.S. Cl.
USPC ....... 340/286.02; 340/3.1; 340/506; 340/517; 340/539.1; 340/8.1

(58) Field of Classification Search
USPC ............... 340/3.1, 825.36, 825.49, 524, 525, 340/539.1, 541, 286.02, 7.1, 506, 507
See application file for complete search history.

(56) References Cited

To view the complete listing of prior art documents cited during the proceeding for Reexamination Control Number 90/011,589, please refer to the USPTO's public Patent Application Information Retrieval (PAIR) system under the Display References tab.

*Primary Examiner* — Henry N Tran

(57) ABSTRACT

A system enables tracking of a communication device associated with a subscriber of a geo-location tracking service. The system receives (1115) a set of subscriber-defined alarm conditions associated with the tracked communication device. The system further receives location (1435) and sensor data (1440) associated with the communication device. The system compares (1510) the location and sensor data with each alarm condition of the set of subscriber-defined alarm conditions. The system indicates an occurrence of one or more alarm events based on the comparison (1520).

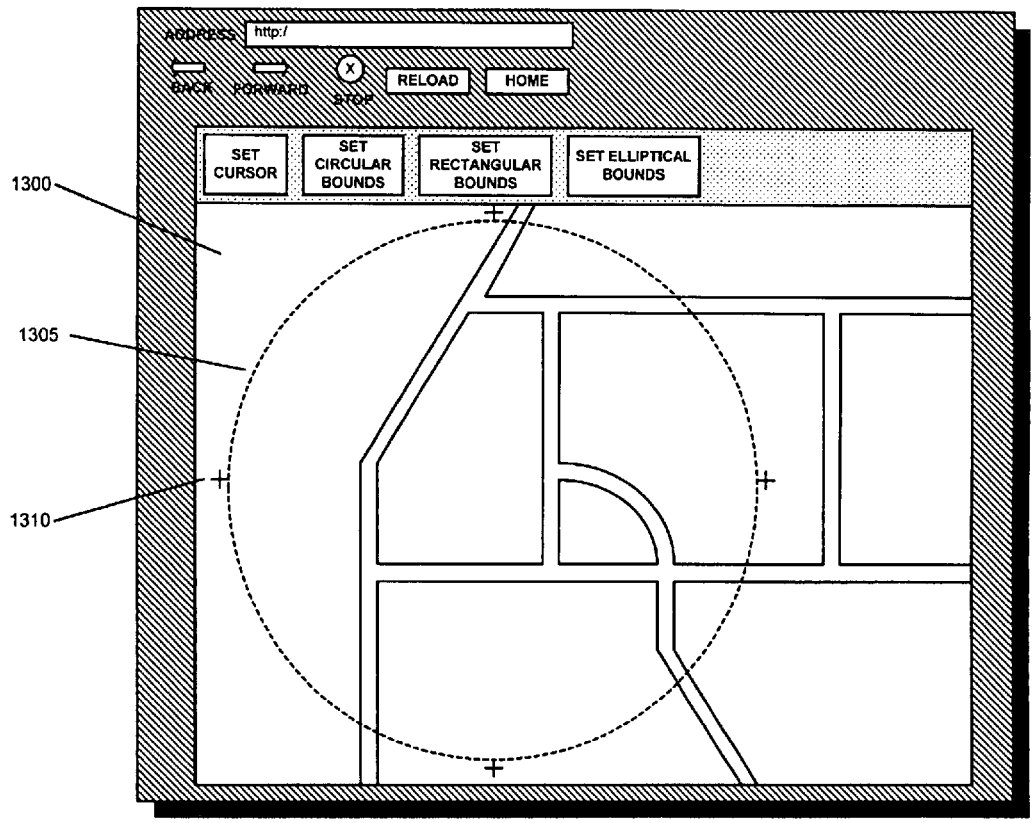

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4-6 and 9-12 are cancelled.

Claim 8 is determined to be patentable as amended.

New claims 28-51 are added and determined to be patentable.

Claims 1-3, 7 and 13-27 were not reexamined.

8. A method of notifying a subscriber of an event notification service of an occurrence of one or more alarm events, comprising:
receiving subscriber identity data identifying a subscriber of said service;
receiving one or more subscriber selected and defined alarm conditions;
receiving data associated with at least one of an environment, movement, and operation of a first communication device;
comparing said data with said alarm conditions to determine an occurrence of one or more alarm events; and
communicating an alarm event notification to the subscriber at a second communication device based on said comparison,
wherein said one or more subscriber *selected and* defined alarm conditions [includes] *include* one or more geographic boundaries associated with a location of said first communication device,
*wherein said one or more geographic boundaries are capable of being selected by said subscriber utilizing a map of a geographic region;*
*wherein said one or more subscriber selected and defined alarm conditions further include one or more times associated with said one or more geographic boundaries.*

28. *The method of claim 8, wherein a type of said alarm event notification is capable of being selected by said subscriber from a plurality of alarm event notification type options.*

29. *The method of claim 8, wherein said geographic region is capable of being selected by said subscriber.*

30. *The method of claim 8, wherein audio communication is provided between said first communication device and said second communication device.*

31. *The method of claim 8, wherein said comparing and said communicating is carried out by at least one server; said first communication device is equipped with telephonic capabilities, global positioning system functionality, and an accelerometer; said subscriber identity data and said subscriber selected and defined alarm conditions are received utilizing the Internet; said data associated with at least one of an environment, movement, and operation of said first communication device is repeatedly received such that said comparing is repeatedly performed utilizing said at least one server.*

32. *The method of claim 8, wherein said an alarm event notification is communicated when said first communication device is not present in association with said one or more geographic boundaries at said associated one or more associated times.*

33. *The method of claim 8, wherein said an alarm event notification is communicated when said first communication device is not present in association with said one or more geographic boundaries during a time period that is defined by a start time and an end time of said associated one or more associated times.*

34. *The method of claim 8, and further comprising displaying a map that includes an icon representative of a real-time location of said first communication device.*

35. *The method of claim 8, and further comprising storing a plurality of historical records with each of said historical records including at least one historical time parameter and at least one historical location parameter, and displaying a graphical user interface that reflects said plurality of historical records.*

36. *The method of claim 8, wherein said one or more geographic boundaries include a plurality of geographic boundaries that define an area; and said data associated with at least one of an environment, movement, and operation of said first communication device includes data associated with the movement.*

37. *A tracking server, comprising:*
*a memory configured to store instructions; and*
*a processor configured to:*
*receive subscriber identity data identifying a subscriber of said service;*
*receive one or more subscriber selected and defined alarm conditions;*
*receive data associated with at least one of an environment, movement and operation of a first communication device;*
*compare said data with said alarm conditions to determine an occurrence of one or more alarm events; and*
*communicate an alarm event notification to a second communication device based on said comparison, wherein said one or more subscriber selected and defined alarm conditions include one or more geographic boundaries associated with a location of said first communication device;*
*wherein said tracker server is configured such that said one or more geographic boundaries are capable of being selected by said subscriber utilizing a map of a geographic region;*
*wherein said tracker server is configured such that said one or more subscriber selected and defined alarm conditions further include one or more times associated with said one or more geographic boundaries.*

38. *The tracking server of claim 37, wherein said tracker server is configured such that a type of said alarm event notification is capable of being selected by said subscriber from a plurality of alarm event notification type options; said data associated with at least one of an environment, movement, and operation of said first communication device is repeatedly received such that said comparing is repeatedly performed; a real-time location is capable of being displayed utilizing a map; a plurality of historical records are capable of being stored with each of said historical records including at least one historical time parameter and at least one historical location parameter for being viewed utilizing a graphical user interface that reflects said plurality of historical records; and said alarm event notification is communicated when said first communication device is not present in* association with said one or more geographic boundaries at said associated one or more associated times.

39. A non-transitory computer-readable medium containing instructions for controlling at least one processor to perform a method of notifying a subscriber of an event notification service of an occurrence of one or more alarm events, the non-transitory computer-readable medium comprising:
  instructions for receiving subscriber identity data identifying a subscriber of said service; receiving one or more subscriber selected and defined alarm conditions;
  instructions for receiving data associated with at least one of an environment, movement and operation of a first communication device;
  instructions for comparing said data with said alarm conditions to determine an occurrence of one or more alarm events; and
  instructions for communicating an alarm event notification to the subscriber at a second communication device based on said comparison, wherein said one or more subscriber selected and defined alarm conditions include one or more geographic boundaries associated with a location of said first communication device;
  wherein said instructions are operable such that said one or more geographic boundaries are capable of being selected by said subscriber utilizing a map of a geographic region;
  wherein said instructions are operable such that said one or more subscriber selected and defined alarm conditions further include one or more times associated with said one or more geographic boundaries.

40. The non-transitory computer-readable medium of claim 39, wherein said instructions are operable such that a type of said alarm event notification is capable of being selected by said subscriber from a plurality of alarm event notification type options; a real-time location is capable of being displayed utilizing a map; a plurality of historical records are capable of being stored with each of said historical records including at least one historical time parameter and at least one historical location parameter for being viewed utilizing a graphical user interface that reflects said plurality of historical records; and said alarm event notification is communicated when said first communication device is not present in association with said one or more geographic boundaries at said associated one or more associated times.

41. A data structure encoded on a computer readable medium, comprising:
  first data indicating an identity of a subscriber of a tracking service;
  second data indicating one or more subscriber selected and defined alarm conditions, said alarm conditions indicating conditions under which one or more alarm events associated with a device occur, the one or more alarm events corresponding to at least one of an environment, movement, and operation of the device;
  third data indicating one or more methods of contacting said subscriber in the event said one or more alarm events occur; and
  fourth data indicating a permissible geographic area associated with said device, wherein said permissible geographic area is capable of being selected by said subscriber utilizing a map of a geographic region;
  wherein said data structure is operable such that one or more subscriber selected times are capable of being selected for use in association with said permissible geographic area.

42. A non-transitory computer-readable medium containing instructions for controlling at least one processor to perform a method of notifying a subscriber of an event notification service of an occurrence of one or more alarm events, the non-transitory computer-readable medium comprising:
  instructions for receiving subscriber identity data identifying a subscriber of said service; receiving one or more subscriber selected and defined alarm conditions;
  instructions for receiving data associated with at least one of an environment, movement and operation of a first communication device;
  instructions for comparing said data with said alarm conditions to determine an occurrence of one or more alarm events; and
  instructions for communicating an alarm event notification to the subscriber at a second communication device based on said comparison, wherein said one or more subscriber selected and defined alarm conditions include one or more geographic boundaries associated with a location of said first communication device;
  wherein said instructions are operable such that said one or more geographic boundaries are capable of being selected by said subscriber utilizing a map of a geographic region;
  wherein said instructions are operable such that one or more subscriber selected times are capable of being selected for use in association with said one or more geographic boundaries.

43. The non-transitory computer-readable medium of claim 42, wherein the instructions are operable such that a type of said alarm event notification is capable of being selected by said subscriber from a plurality of alarm event notification type options.

44. The non-transitory computer-readable medium of claim 42, wherein the instructions are operable such that said geographic region is capable of being selected by said subscriber.

45. The non-transitory computer-readable medium of claim 42, wherein the instructions are operable such that said one or more subscriber selected and defined alarm conditions include said one or more subscriber selected times and audio communication is provided between said first communication device and said second communication device.

46. The non-transitory computer-readable medium of claim 42, wherein the instructions are operable such that said comparing and said communicating is carried out by at least one server; said first communication device is equipped with telephonic capabilities, global positioning system functionality, and an accelerometer; said subscriber identity data and said subscriber selected and defined alarm conditions are received utilizing a network; said data associated with at least one of an environment, movement, and operation of said first communication device is repeatedly received such that said comparing is repeatedly performed utilizing said at least one server.

47. The non-transitory computer-readable medium of claim 42, wherein the instructions are operable such that said an alarm event notification is communicated when said first communication device is not present in association with said one or more geographic boundaries at said one or more subscriber selected times.

48. The non-transitory computer-readable medium of claim 42, wherein the instructions are operable such that said alarm event notification is communicated when said first communication device is not present in association with said one or more geographic boundaries during a time period that is defined by a start time and an end time of said one or more subscriber selected times.

49. The non-transitory computer-readable medium of claim 42, and further comprising code for displaying a map that includes an icon representative of a real-time location of said first communication device.

50. The non-transitory computer-readable medium of claim 42, wherein the instructions are operable such that said one or more subscriber selected times are used in association with said one or more geographic boundaries such that said alarm event notification is communicated as a function of both said one or more subscriber selected times and said one or more geographic boundaries.

51. The non-transitory computer-readable medium of claim 42, wherein the instructions are operable such that said one or more geographic boundaries include a plurality of geographic boundaries that define an area; and said data associated with at least one of an environment, movement, and operation of said first communication device includes data associated with the movement.

\* \* \* \* \*